(12) United States Patent
Saisho et al.

(10) Patent No.: US 10,156,728 B2
(45) Date of Patent: Dec. 18, 2018

(54) INFORMATION PROVISION DEVICE, INFORMATION PROVISION METHOD, AND RECORDING MEDIUM

(71) Applicants: Kenichiroh Saisho, Tokyo (JP); Yuuki Suzuki, Kanagawa (JP); Masato Kusanagi, Kanagawa (JP)

(72) Inventors: Kenichiroh Saisho, Tokyo (JP); Yuuki Suzuki, Kanagawa (JP); Masato Kusanagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 189 days.

(21) Appl. No.: 15/136,088

(22) Filed: Apr. 22, 2016

(65) Prior Publication Data

US 2016/0313562 A1    Oct. 27, 2016

(30) Foreign Application Priority Data

Apr. 24, 2015 (JP) .................................. 2015-089238
Apr. 30, 2015 (JP) .................................. 2015-092590

(51) Int. Cl.
*G02B 27/01* (2006.01)
*B60K 35/00* (2006.01)
(Continued)

(52) U.S. Cl.
CPC .......... *G02B 27/0179* (2013.01); *B60K 35/00* (2013.01); *B60R 1/00* (2013.01);
(Continued)

(58) Field of Classification Search
CPC ........ G02B 27/0179; G02B 2027/0185; G02B 2027/014; G02B 2027/0181; G02B 27/01;
(Continued)

(56) References Cited

U.S. PATENT DOCUMENTS

2009/0296768 A1    12/2009 Hara et al.
2013/0038437 A1 *   2/2013 Talati .................... B60K 35/00
                                                              340/438
(Continued)

FOREIGN PATENT DOCUMENTS

GB          2472773 A      2/2011
JP          3-012951       1/1991
(Continued)

*Primary Examiner* — Andrew Sasinowski
(74) *Attorney, Agent, or Firm* — Oblon, McClelland, Maier & Neustadt, L.L.P.

(57) ABSTRACT

An information provision device includes an image display to display a for-driver information image to a driver of a mobile object, an interface to obtain at least one of (i) movement information of the mobile object and (ii) position information of the mobile object, and a circuitry to control display of the for-driver information image based on a viewpoint position of the driver that is detected by a viewpoint detector. The circuitry changes a display position of the for-driver information image so as to change a perception distance of the for-driver information image for the driver due to motion parallax based on the at least one of movement information and position information of the mobile object that is obtained.

21 Claims, 14 Drawing Sheets

(51) Int. Cl.
*G09G 5/38* (2006.01)
*G09G 3/00* (2006.01)
*G09G 5/00* (2006.01)
*B60R 1/00* (2006.01)

(52) U.S. Cl.
CPC ......... *G02B 27/01* (2013.01); *G02B 27/0101* (2013.01); *G09G 3/002* (2013.01); *G09G 5/006* (2013.01); *G09G 5/38* (2013.01); *B60K 2350/1096* (2013.01); *B60K 2350/2052* (2013.01); *B60K 2350/901* (2013.01); *B60R 2300/30* (2013.01); *G02B 2027/014* (2013.01); *G02B 2027/0129* (2013.01); *G02B 2027/0181* (2013.01); *G02B 2027/0183* (2013.01); *G02B 2027/0185* (2013.01)

(58) Field of Classification Search
CPC ........ G02B 27/0101; G02B 2027/0129; G02B 2027/0183; B60R 1/00; B60R 2300/30; G09G 5/38; G09G 3/002; G09G 5/006; B60K 2350/901; B60K 2350/2052; B60K 2350/1096; B60K 35/00
See application file for complete search history.

(56) References Cited

U.S. PATENT DOCUMENTS

| | | |
|---|---|---|
| 2014/0177022 A1 | 6/2014 | Saisho et al. |
| 2015/0062022 A1* | 3/2015 | Rabii .................. G06T 1/20 345/173 |
| 2015/0073907 A1* | 3/2015 | Purves ................. G06Q 20/32 705/14.58 |
| 2015/0332103 A1 | 11/2015 | Yokota et al. |
| 2015/0334269 A1 | 11/2015 | Yokota et al. |
| 2015/0370069 A1 | 12/2015 | Saisho et al. |
| 2016/0003636 A1* | 1/2016 | Ng-Thow-Hing ..... H04N 7/188 701/26 |

FOREIGN PATENT DOCUMENTS

| | | |
|---|---|---|
| JP | 9-260539 | 10/1997 |
| JP | 11-048520 | 2/1999 |
| JP | 11-251689 | 9/1999 |
| JP | 2000-349384 | 12/2000 |
| JP | 2001-156395 | 6/2001 |
| JP | 2001-267681 | 9/2001 |
| JP | 2001-284704 | 10/2001 |
| JP | 2001-291924 | 10/2001 |
| JP | 2004-006592 | 1/2004 |
| JP | 2004-288713 | 10/2004 |
| JP | 2004-289033 | 10/2004 |
| JP | 2005-014141 | 1/2005 |
| JP | 2005-086054 | 3/2005 |
| JP | 2005-167008 | 6/2005 |
| JP | 2006-202998 | 8/2006 |
| JP | 2007-103576 | 4/2007 |
| JP | 2007-142425 | 6/2007 |
| JP | 2007-201398 | 8/2007 |
| JP | 2010-034506 | 2/2010 |
| JP | 2010-072455 | 4/2010 |
| JP | 2011-073466 | 4/2011 |
| JP | 2014-115670 | 6/2014 |
| JP | 2014-139656 | 7/2014 |
| JP | 2014-139657 | 7/2014 |
| JP | 2015-148664 | 8/2015 |
| JP | 2015-219631 | 12/2015 |
| JP | 2015-219632 | 12/2015 |
| WO | WO98/053537 A1 | 11/1998 |

* cited by examiner

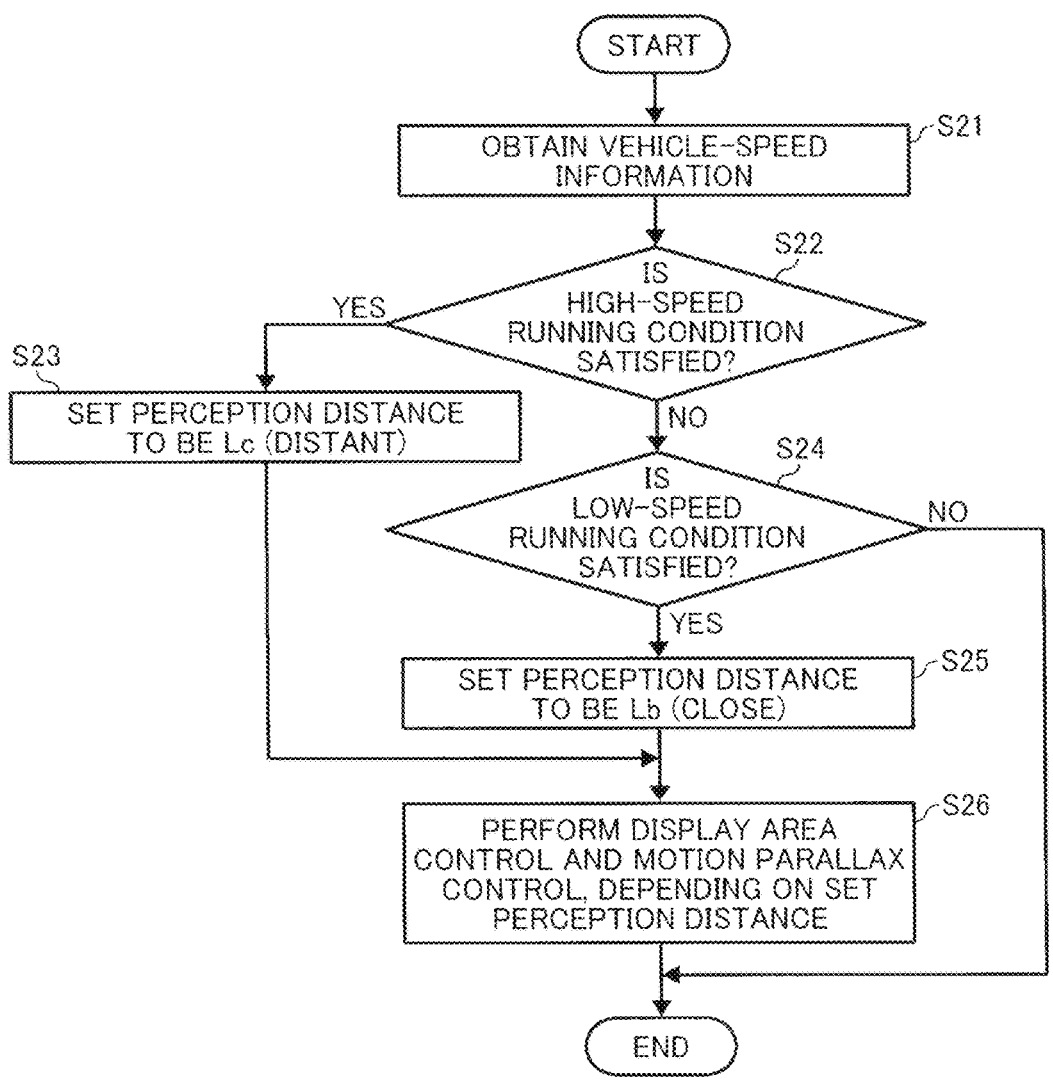

INFORMATION PROVISION DEVICE, INFORMATION PROVISION METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2015-089238, filed on Apr. 24, 2015, and 2015-092590, filed on Apr. 30, 2015, in the Japan Patent Office, the entire disclosure of which is hereby incorporated by reference herein.

BACKGROUND

Technical Field

Embodiments of the present invention relate to an information provision device, an information provision method, and a non-transitory recording medium storing an information-provision control program.

Description of the Related Art

An information provision device for which a heads-up display (HUD) or the like is provided is known in the art, and such a HUD projects an image to provide information to the driver of a mobile object such as a vehicle, ship, aircraft, and a steel-collar worker (robot).

JP-4686586-B discloses a HUD that projects an image light to a front windshield or the like (light transmission member) to display an image over the sight ahead of the vehicle (mobile object) which is visually recognized by the driver through the front windshield. Such a HUD displays an arrow indicating the direction of travel, and an object indicating, for example, the speed, caution, and warning over the sight ahead of the vehicle, as a virtual image. The HUD includes a point detector (viewpoint detector) that captures the driver to detect the position of a single eye of the driver, and changes the respective positions of the objects in the virtual image according to the result of the detection. More specifically, the HUD changes the amounts of movement of the objects in the virtual image when the driver has moved his or her head and the location of the viewpoint (the position of the single eye) has moved. Accordingly, the driver perceives the objects as if the display position of the objects in the depth direction (subjective depth dimension) vary due to the motion parallax.

SUMMARY

Embodiments of the present invention include an information provision device, which includes an image display to display a for-driver information image to a driver of a mobile object, an interface to obtain at least one of (i) movement information of the mobile object and (ii) position information of the mobile object, and circuitry to control display of the for-driver information image based on a viewpoint position of the driver that is detected by a viewpoint detector. The circuitry changes a display position of the for-driver information image so as to change a perception distance of the for-driver information image for the driver due to motion parallax based on the at least one of movement information and position information of the mobile object that is obtained.

In one example, in the information provision device, the circuitry further determines whether the detection result of the viewpoint detector satisfies a predetermined abnormal condition, and performs abnormality handling operation instead of performing the display control of the for-driver information.

Embodiments of the present invention include an information provision device, which includes an image display to display a for-driver information image to a driver of a mobile object, and circuitry to control display of the for-driver information image based on a viewpoint position of the driver that is detected by a viewpoint detector. The circuitry changes a display position of the for-driver information image so as to change a perception distance of the for-driver information image for the driver due to motion parallax. The circuitry determines whether the detection result of the viewpoint detector satisfies a predetermined abnormal condition, and performs abnormality handling operation instead of performing the display control of the for-driver information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings.

FIG. 15 is a flowchart illustrating operation of controlling display of the following-distance presenting image in a third example.

Figure 1:
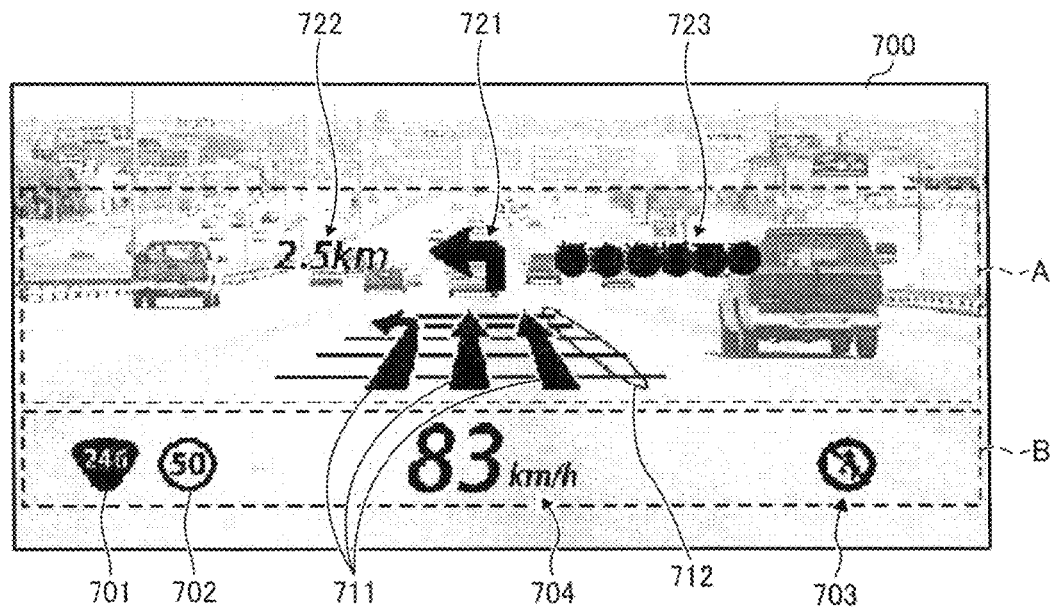
FIG. 1 is a schematic diagram of an example virtual image displayed in a display area over the sight ahead of the vehicle viewed by a driver through the front windshield, according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that operate in a similar manner.

An information provision system for a driver, which serves as an information provision device, to which an on-vehicle heads-up display (HUD) according to an embodiment of the present invention is applied, is described.

FIG. 1 is a schematic diagram of an example virtual image G displayed in a display area 700 over the sight ahead of the vehicle 301 viewed by a driver 300 through a front windshield 302, according to the present embodiment.

Figure 2:
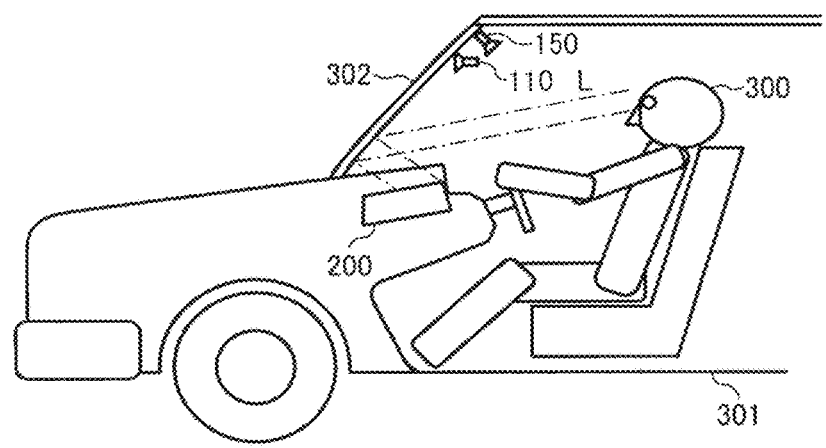
FIG. 2 is a schematic diagram of the configuration of a car for which an on-vehicle HUD according to an embodiment of the present invention is provided.

FIG. 2 is a schematic diagram of a car for which the on-vehicle HUD according to the present example embodiment is provided.

Figure 3:
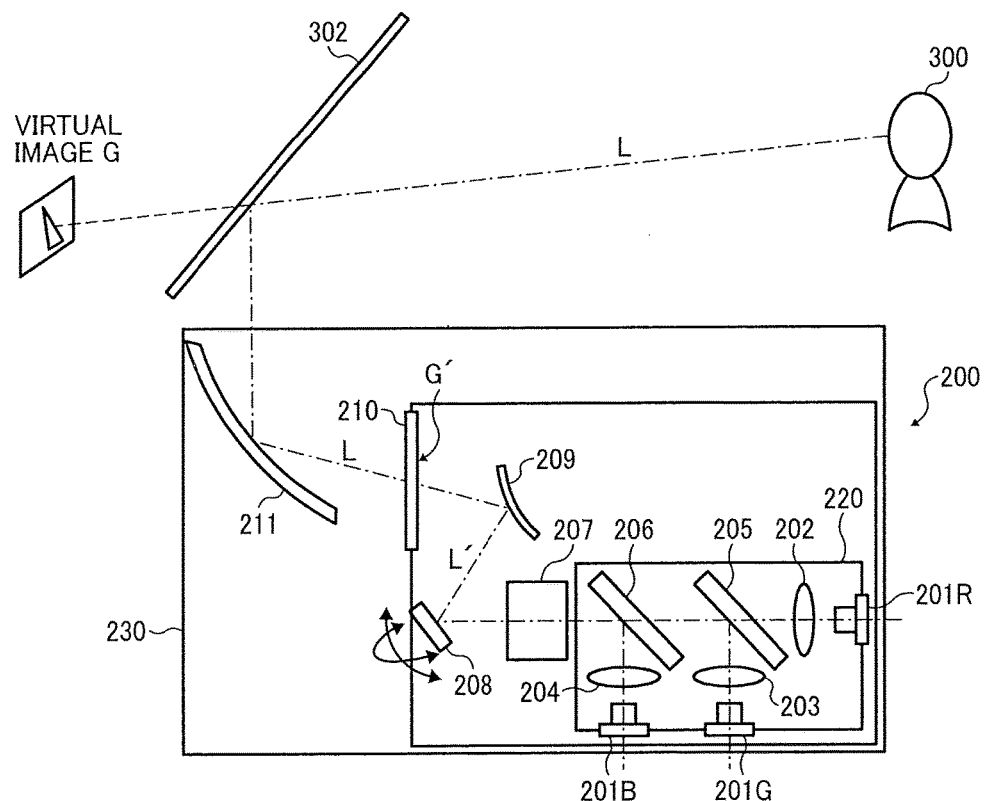
FIG. 3 is a schematic diagram of the internal structure of an on-vehicle HUD according to an example embodiment of the present invention.

FIG. 3 is a schematic diagram of the internal structure of the on-vehicle HUD according to the present example embodiment.

An on-vehicle HUD 200 according to the present embodiment is installed, for example, in the dashboard of the car 301 that serves as a mobile object. The projection light L, which is the light for projecting an image, that is emitted from the on-vehicle HUD 200 disposed in the dashboard is reflected at a front windshield 302 that serves as a light transmission member, and is headed for a driver 300. Accordingly, the driver 300 can visually recognize a HUD display image such as a navigation image, which will be described later, as a virtual image. Note that a combiner that serves as a light transmission member may be disposed on the inner wall of the front windshield 302, and the driver 300 may visually recognizes a virtual image formed by the projection light L that is reflected by the combiner.

In the present embodiment, the optical system or the like of the on-vehicle HUD 200 is configured such that the distance from the driver 300 to a virtual image G becomes equal to or longer than 5 meters (m). In the known on-vehicle HUDs, the distance from the driver 300 to the virtual image G is about 2 m. Usually, the driver 300 observes a point at infinity ahead of the vehicle, or observes a preceding vehicle a few tens of meters ahead of the vehicle. When the driver 300 who is focusing on an object in the distance attempts to visually recognize the virtual image G that is two meters ahead of the vehicle, the crystalline lenses of the eyes need to be moved widely because the focal length greatly varies. In such cases, the time required to adjust the focus of the eyes and focus on the virtual image G becomes longer, and it takes a long time to recognize the detail of the virtual image G. What is worse, the eyes of the driver 300 tend to get tired. Moreover, it is difficult for the driver to realize the detail of the virtual image G, and it is difficult to use the virtual image G to appropriately provide information to the driver.

If the distance to the virtual image G is equal to or longer than 5 m as in the present embodiment, the amount of movement in the crystalline lenses of the eyes is reduced to a less amount of movement than the background art, and the time required to adjust the focus of the eyes and focus on the virtual image G becomes shorter. Accordingly, the driver 300 can recognize the detail of the virtual image G at an early stage, and the possible tiredness of the eyes of the driver 300 can be reduced. Moreover, it becomes easier for the driver to realize the detail of the virtual image G, and it is easy to use the virtual image G to appropriately provide information to the driver.

When the distance to the virtual image G is about 2 m, the driver attempts to adjust the focal point of the eyes on the virtual image G, usually through the convergence motion. The convergence motion is a major factor in achieving the desired sense of distance or depth perception to an object to be visually recognized. In the present embodiment, as will be described later, the display is controlled such that the perception distance of the virtual image G will be perceived by motion parallax. If the convergence motion occurs to the eyes to focus on the virtual image G when the display is controlled as above, the sense of distance (change in perception distance) or the depth perception (difference in perception distance), which are expected to be brought by a motion parallax, cannot be perceived as desired. Accordingly, if the convergence motion occurs to the eyes, the driver cannot perceive the information as intended by the configuration according to the present embodiment. Note that such configuration will be described later, and the effect is estimated in view of the difference or change in the perception distance of an image.

When the distance to the virtual image G is equal to or greater than 5 m, the driver can focus on the virtual image G with almost no convergence motion in the eyes. Accordingly, the sense of distance (change in perception distance) or the depth perception (difference in perception distance), which are expected to be brought by motion parallax, can be perceived as desired in absence of the convergence motion of the eyes. As described above, according to the present embodiment, the driver perceive the information as intended in view of the sense of distance or depth perception of an image.

The on-vehicle HUD 200 includes a HUD 230, and the HUD 230 includes red, green, and blue laser beam sources 201R, 201G, and 201B, collimator lenses 202, 203, and 204 that are provided for the laser beam sources 201R, 201G, and 201B, respectively, two dichroic mirrors 205 and 206, a light quantity adjuster 207, an optical scanner 208, a free-form surface mirror 209, a microlens array 210 that serves as a light dispersing member, and a projector mirror 211 that serves as a light reflecting member. A light source unit 220 according to the present embodiment includes the laser beam sources 201R, 201G, and 201B, the collimator lenses 202, 203, and 204, and the dichroic mirrors 205 and 206, and these elements are unitized by an optical housing.

Each of the laser beam sources 201R, 201G, and 201B may be an LD (semiconductor laser element). The wavelength of the laser-beam bundle that is emitted from the red laser beam source 201R is, for example, 640 nanometer (nm). The wavelength of the laser-beam bundle that is emitted from the green laser beam source 201G is, for example, 530 nm. The wavelength of the laser-beam bundle that is emitted from the blue laser beam source 201B is, for example, 445 nm.

The on-vehicle HUD 200 according to the present embodiment projects the intermediate image formed on the microlens array 210 onto the front windshield 302 of the vehicle 301, such that the driver 300 can visually recognize the magnified intermediate image as a virtual image G. The laser beams of RGB colors emitted from the laser beam sources 201R, 201G, and 201B are approximately collimated by the collimator lenses 202, 203, and 204, and are combined by the two dichroic mirrors 205 and 206. The light quantity of the combined laser beam is adjusted by the light quantity adjuster 207, and then the adjusted laser beam is two-dimensionally scanned by the mirror of the optical scanner 208. The scanned light L' that is two-dimensionally scanned by the optical scanner 208 is reflected by the free-form surface mirror 209 so as to correct the distortion, and then is collected and condensed to the microlens array 210. Accordingly, an intermediate image is drawn.

In the present embodiment, the microlens array 210 is used as a light dispersing member that individually disperses and emits the laser-beam bundle of each pixel of the intermediate image (i.e., each point of the intermediate image). However, any other light dispersing member may be used. Alternatively, a liquid crystal display (LCD) or a vacuum fluorescent display (VFD) may be used as a method of forming the intermediate image G'.

However, in order to display the virtual image G with a wide dimension and high brightness, the laser scanning system is desired as in the present embodiment.

In the systems where an LCD or VFD is used, a non-image area of the display area on which the virtual image G is displayed is slightly irradiated with light, and it is difficult to completely shut such light to the non-image area. For this reason, in the systems where an LCD or VFD is used, the non-image area disturbs the visual recognizability of the sight ahead of the vehicle 301. By contrast, if a laser scanning system is adopted as in the present embodiment, the light that irradiates the non-image area of the display area on which the virtual image G is displayed can be completely shut by switching off the laser beam sources 201R, 201G, and 201B. For this reason, if a laser scanning system is adopted as in the present embodiment, the non-image area does not disturb the visual recognizability of the sight ahead of the vehicle 301 as the light from the on-vehicle HUD 200 that may irradiate the non-image area can be completely shut.

When the degree of warning is to be enhanced by gradually increasing the brightness of the warning image that alerts the driver, the display needs to be controlled such that only the brightness of the warning image gradually increases among the various kinds of images displayed in the display area 700. Again, the laser scanning system is suitable for such cases where the display is controlled such that the brightness of a part of the images displayed in the display area 700 is selectively increased. In the systems with the LCD or the VFD, the brightness of the images other than the warning image also increases among the various kinds of images displayed in the display area 700. In such cases, the difference in brightness cannot be increased between the warning image and the other images. Accordingly, the degree of the warning cannot be sufficiently enhanced by gradually increasing the brightness of the warning image.

The optical scanner 208 uses a known actuator driver system such as a micro-electromechanical systems (MEMS) to incline the mirror to the main-scanning direction and the sub-scanning direction, and two-dimensionally scans (raster-scans) the laser beams that enter the mirror. The mirror is controlled in synchronization with the timing at which the laser beam sources 201R, 201G, and 201B emit light. The optical scanner 208 may be configured, for example, by a mirror system that includes two mirrors that pivot or rotate around the two axes that are orthogonal to each other.

Figure 4:
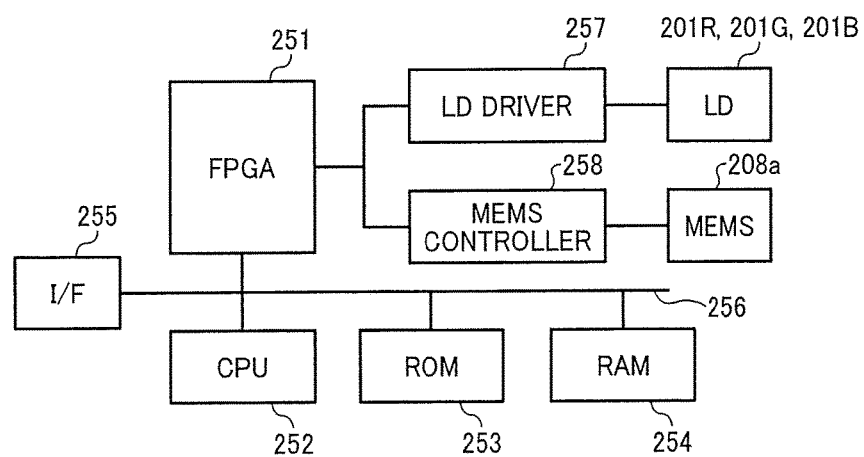
FIG. 4 is a block diagram illustrating the hardware configuration of a control system of an on-vehicle HUD according to an example of the present invention.

FIG. 4 is a block diagram illustrating the hardware configuration of a control system of the on-vehicle HUD 200 according to the present embodiment.

The control system of the on-vehicle HUD 200 includes a field programmable gate array (FPGA) 251, a central processing unit (CPU) 252, a read only memory (ROM) 253, a random access memory (RAM) 254, an interface (I/F) 255, a bus line 256, a laser diode (LD) driver 257, and a MEMS controller 258. The FPGA 251 uses the LD driver 257 to control the operation of the laser beam sources 201R, 201G, and 201B of the light source unit 220. Moreover, the FPGA 251 uses the MEMS controller 258 to controlling the operation of a MEMS 208a of the optical scanner 208. The CPU 252 controls the operation of the on-vehicle HUD 200. The ROM 253 stores various kinds of programs such as an image processing program that is executed by the CPU 252 to control the operation of the on-vehicle HUD 200. The RAM 254 is mainly used as a working area in which the CPU 252 executes a program. The I/F 255 allows the on-vehicle HUD 200 to communicate with an external controller such as a controller area network (CAN) of the vehicle 301. For example, the on-vehicle HUD 200 is connected to an object recognition device 100, a vehicle navigation device 400, and various kinds of sensor device 500 through the CAN of the vehicle 301. The object recognition device 100, the vehicle navigation device 400, and the sensor device 500 will be described later in detail.

Figure 5:
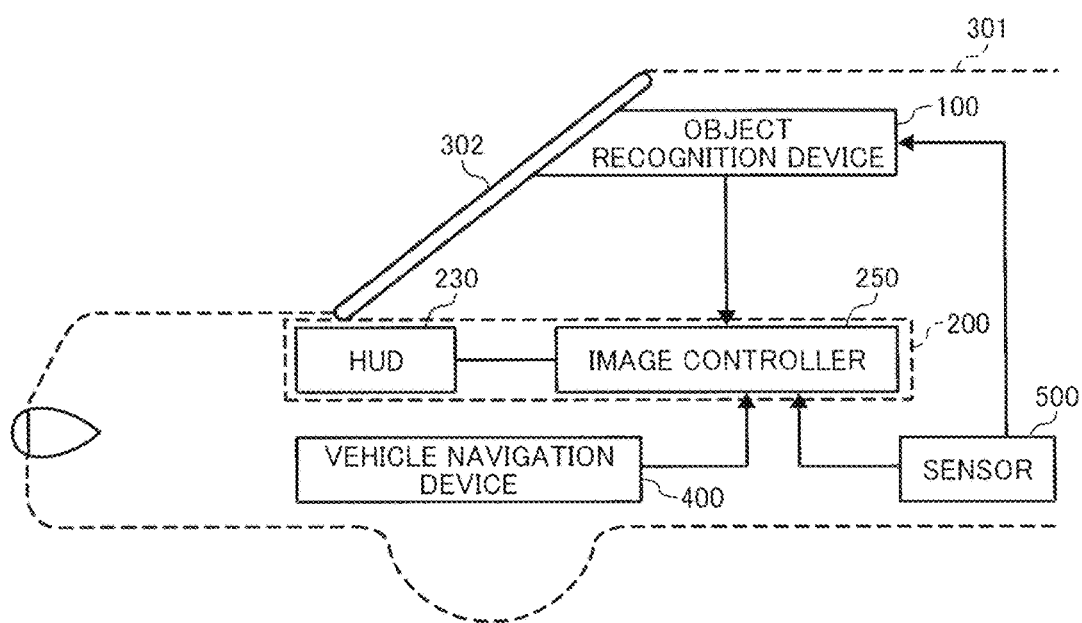
FIG. 5 is a block diagram illustrating an outline of the configuration of an information provision system for a driver, according to an embodiment of the present invention.

FIG. 5 is a block diagram illustrating an outline of the configuration of an information provision system for a driver according to the present embodiment.

In the present embodiment, as an information acquisition unit that obtains for-driver information to be provided to a driver via a virtual image G, the object recognition device 100, the vehicle navigation device 400, and the sensor device 500 are provided. The on-vehicle HUD 200 according to the present embodiment includes the HUD 230 that serves as an image-light projection device, and the image controller 250 including a processor serving as a display controller. The information acquisition unit according to the present embodiment is provided for the vehicle 301, but the vehicle 301 may use an external information acquisition unit to obtain the information input from the external information acquisition unit through a means of communication.

Figure 6:
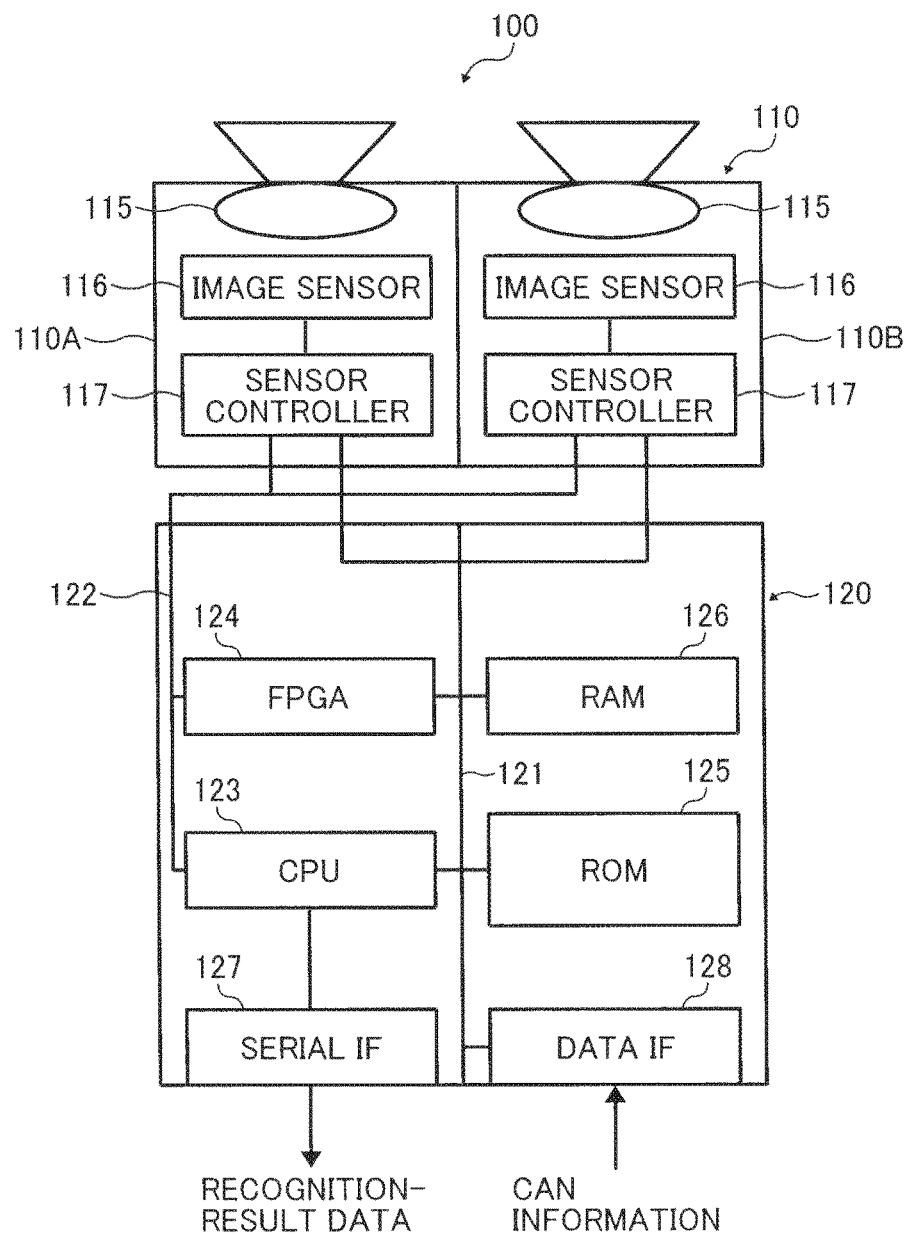
FIG. 6 is a schematic block diagram illustrating the hardware configuration of an object recognition device in an information provision system for a driver, according to an embodiment of the present invention.

FIG. 6 is a schematic block diagram illustrating the hardware configuration of the object recognition device 100 according to the present embodiment.

The object recognition device 100 according to the present embodiment includes a stereo camera 110 that captures an area ahead of the vehicle 301 as a captured area, and an information processing unit 120 that performs image processing to recognize a prescribed object existing in the captured area according to the image data captured by the stereo camera 110. Note that the stereo camera 110 may be replaced with a combination of a monocular camera that serves as an imaging unit, and a laser radar (millimeter-wave radar) that serves as a distance measuring equipment.

The stereo camera 110 includes a first camera unit 110A for a left eye and a second camera unit 110B for a right eye, and these two camera units are combined together in parallel. Each of the camera unit 110A and the camera unit 110B includes a lens 115, an image sensor 116, and a sensor controller 117. The image sensor 116 may be composed of, for example, a charge-coupled device (CCD) or a complementary metal oxide semiconductor (CMOS). The sensor controller 117 controls, for example, the exposure of the image sensor 116, the reading of an image, the communication with an external circuit, and the sending of the image data. The stereo camera 110 is disposed near the rear-view mirror provided for the front windshield 302 of the vehicle 301.

The information processing unit 120 includes a data bus line 121, a serial bus line 122, central processing unit (CPU) 123, a field programmable gate array (FPGA) 124, a read only memory (ROM) 125, a random access memory (RAM) 126, a serial interface (IF) 127, and a data interface (IF) 128.

The stereo camera 110 is connected to the information processing unit 120 through the data bus line 121 and the serial bus line 122. The CPU 123 controls, for example, the sensor controllers 117 of the stereo camera 110, the entire operation of the information processing unit 120, and the execution of image processing. The brightness image data of the images that are captured by the image sensors 116 of the camera unit 110A and the camera unit 110B are written into the RAM 126 of the information processing unit 120 through the data bus line 121. The control data for changing the exposure value of a sensor from the CPU 123 or the FPGA 124, the control data for changing the image reading parameter, various kinds of setting data, or the like are transmitted and received through the serial bus line 122.

The FPGA 124 performs processing that needs to be done in real time on the image data stored in the RANI 126, such as gamma correction, distortion correction (collimation of an image on the right and left), parallax computation using block matching, to generate a parallax image, and writes the generated parallax image into the RAM 18 again. In the ROM 125, a recognition program is stored for recognizing a prescribed object including a three-dimensional object such as a vehicle or pedestrian, a boundary line for lanes such as a white line on the road, and a curbstone or median strip arranged by the roadside. The recognition program is an example of an image processing program.

The CPU 123 obtains CAN information such as vehicle speed, acceleration, a rudder angle, and a yaw rate from the sensor device 500 through the data interface (IF) 128. The data interface 128 may be, for example, a CAN of the vehicle 301. Then, the CPU 123 performs image processing using the brightness image and parallax image stored in the RANI 126, according to the recognition program stored in the ROM 125, and recognizes an object such as a preceding vehicle 350 or a traffic lane line.

The recognition-result data of an object is supplied, for example, to the image controller 250 and an external device such as a vehicle drive control unit, through the serial I/F 127. The vehicle drive control unit uses the recognition-result data of an object to perform brake control, speed control, steering control, or the like of the vehicle 301, and implements, for example, cruise control in which the vehicle 301 automatically tracks a preceding vehicle so as to maintain a prescribed following distance, and an automatic brake control in which the collision with an obstacle ahead of the vehicle is avoided or attenuated.

The vehicle navigation device 400 according to the present embodiment may be any known vehicle navigation device provided for a vehicle or the like. The vehicle navigation device 400 outputs information used for generating a route navigation image to be displayed on a virtual image G, and the information output from the vehicle navigation device 400 is input to the image controller 250. The information that is output from the vehicle navigation device 400 includes, for example, as illustrated in FIG. 1, images indicating the number of the lanes (traffic lanes) of the road on which the vehicle 301 is traveling, the distance to the next point where the direction is to be changed (for example, a right turn, left turn, and a branch point), and the direction to which the path is to be changed next in order. As such information is input from the vehicle navigation device 400 to the image controller 250, under the control of the image controller 250, the on-vehicle HUD 200 displays navigation images such as a lane indicator image 711, a following-distance presenting image 712, a path indicator image 721, a remaining distance indicator image 722, an intersection or the like name indicator image 723, on an upper display area A of the display area 700.

In the example image illustrated in FIG. 1, images indicating road-specific information (e.g., road name, and speed limit) is displayed on a lower display area B of the display area 700. The road-specific information is also input from the vehicle navigation device 400 to the image controller 250. The image controller 250 uses the on-vehicle HUD 200 to display the road-specific information such as a road-name display image 701, a speed limit display image 702, and a no-passing zone display image 703 on the lower display area B of the display area 700.

The sensor device 500 according to the present embodiment includes one or two or more sensors that detect various kinds of information such as the behavior of the vehicle 301, the state of the vehicle 301, and the environment around the vehicle 301. The sensor device 500 outputs sensing information used for generating an image to be displayed as a virtual image G, and the information output from the sensor device 500 is input to the image controller 250. For example, in the example image illustrated in FIG. 1, a vehicle speed display image 704 indicating the speed of the vehicle 301 (i.e., the textual image of "83 km/h" in FIG. 1) is displayed on the lower display area B of the display area 700. The vehicle-speed information included in the CAN information of the vehicle 301 is input from the sensor device 500 to the image controller 250, and the image controller 250 controls the on-vehicle HUD 200 to display the textual image indicating the vehicle speed on the lower display area B of the display area 700.

In addition to the sensor that detects the speed of the vehicle 301, the sensor device 500 includes, for example, a laser radar or imaging device that detects the distance from another vehicle, a pedestrian, or construction such as a guard rail and a utility pole, which exist around (ahead of, on the side of, in the rear of) the vehicle 301, a sensor that detects the external environmental information (e.g., outside air temperature, brightness, and weather) of the vehicle 301, a sensor that detects the driving action (e.g., braking action, and the degree of acceleration) of the driver 300, a sensor that senses the amount of the fuel remaining in the fuel tank of the vehicle 301, and a sensor that senses the state of various kinds of vehicle-borne equipment such as an engine and a battery. As such information is detected by the sensor device 500 and sent to the image controller 250, the on-vehicle HUD 200 can display the information as a virtual image G. Accordingly, the information can be provided to the driver 300.

Figure 7:
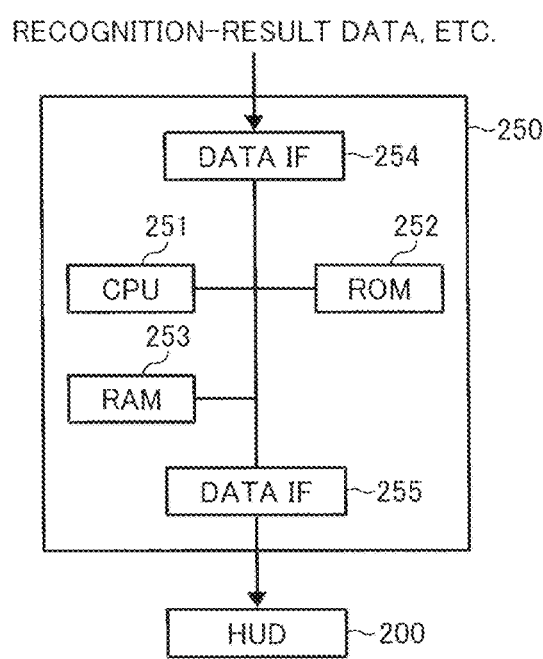
FIG. 7 is a schematic block diagram illustrating the hardware configuration of an image controller in an on-vehicle HUD according to an embodiment of the present invention.

FIG. 7 is a schematic block diagram illustrating the hardware configuration of the image controller 250.

In the image controller 250, a CPU 251, a RAM 252, a ROM 253, an input data interface (I/F) 254, and output data interface (I/F) 255 are connected to each other via a data bus line. To the input data I/F 254, for example, various kinds of recognition-result data output from the object recognition device 100, the sensing information output from the sensor device 500, and various kinds of information output from the vehicle navigation device 400 are input. From the output data I/F 255, for example, a control signal for the on-vehicle HUD 200 is output. The CPU 251 executes various kinds of computer program such as an information-provision control program, which is stored, for example, in the ROM 253, to control the image controller 250 to perform various kinds of control and process as will be described later.

Next, a virtual image G that is displayed by the on-vehicle HUD 200 according to the present embodiment is described.

In the present embodiment, for-driver information that the on-vehicle HUD 200 provides for the driver 300 via a virtual image G may be any information. In the present embodiment, the for-driver information is broadly divided into passive information and active information.

The passive information is the information to be passively recognized by the driver 300 at the timing when a prescribed information provision condition is met. Accordingly, the passive information includes the information to be provided to the driver 300 at the timing when the on-vehicle HUD 200 is configured, and the passive information includes the information whose provision timing has a certain relation with the detail of the information. The passive information includes, for example, security information for driving, and route navigation information. The security information for driving includes, for example, the following-distance information indicating the distance between the vehicle 301 and the preceding vehicle 350 (i.e., a following-distance presenting image 712 as will be described later), and information including urgent matters for driving (e.g., warning information such as an instruction for urgent action to be taken by a driver, or attention attracting information). The route navigation information indicates a route to a prescribed destination, and such a route is provided to a driver by any known vehicle navigation device. The route navigation information includes, for example, lane information (i.e., the lane indicator image 711) indicating a lane to be taken at an upcoming intersection, and direction-change instruction information indicating a direction change to be made at the next intersection or branch point where the direction is to be changed from the straight-ahead direction. The direction-change instruction information includes, for example, path indicating information (i.e., the path indicator image 721) that indicates the path to be taken at the next intersection or branch point, remaining distance information (i.e., the remaining distance indicator image 722) indicating the distance to the intersection or branch point where the direction change is to be made, and name information of the intersection or branch point (i.e., the intersection or the like name indicator image 723).

The active information is the information to be actively recognized by the driver 300 at the timing specified by the driver himself or herself. The active information is to be provided to the driver 300 only when he or she wishes. For example, the active information includes information where the timing of its provision has low or no relevance to the detail of the information. As the active information is obtained by the driver 300 at the timing when he or she wishes, the active information is usually displayed for a long time or displayed continuously. For example, the road-specific information of the road on which the vehicle 301 is traveling, the vehicle-speed information (i.e., the vehicle speed display image 704) of the vehicle 301, the current-time information are included in the active information. The road-specific information includes, for example, the road-name information (i.e., the road-name display image 701), the regulation information of the road such as speed limit (i.e., the speed limit display image 702 and the no-passing zone display image 703), and other kinds of information of the road useful for the driver.

In the present embodiment, the for-driver information, which is broadly divided into the active information and the passive information as described above, is displayed in a corresponding area of the display area 700 where a virtual image is displayable. More specifically, in the present embodiment, the display area 700 is divided into two display areas in the up-and-down directions. Then, a passive-information image that corresponds to the passive information is mainly displayed in the upper display area A of the obtained three display areas, and an active-information image that corresponds to the active information is mainly displayed in the lower display area B. Note that only some of the active-information image may be displayed upper display area A. In such cases, the active-information image is displayed in such a manner that a higher priority is given to the viewability of the passive-information image displayed in the upper display area A.

In the present embodiment, a stereoscopic image is used as the virtual image G that is displayed in the display area 700. More specifically, perspective images are used as the lane indicator image 711 and the following-distance presenting image 712 that are displayed in the upper display area A of the display area 700.

More specifically, a perspective image that is drawn by the perspective drawing method such that the length of the five horizontal lines of the following-distance presenting image 712 becomes shorter towards the upper side and the following-distance presenting image 712 heads for a single vanishing point. In particular, in the present embodiment, the following-distance presenting image 712 is displayed such that the vanishing point approximately matches the observation point of the driver 300. Due to this configuration, while the driver 300 is driving, he or she can easily perceive the depth of the following-distance presenting image 712. Moreover, in the present embodiment, a perspective image in which the thickness of the horizontal lines becomes thinner towards the upper side and the brightness of the horizontal lines becomes lower towards the upper side is used. Due to this configuration, while the driver 300 is driving, he or she can even more easily perceive the depth of the following-distance presenting image 712.

Next, a method of creating a sense of distance or depth perception by making the driver perceive the distance to the virtual image G making use of a motion parallax is described.

In the present embodiment, a motion-parallax image is used as the virtual image G. The motion parallax indicates the parallax that is caused as the position of the eyes of the driver 300 (i.e., the position of the viewpoint) moves. The driver 300 perceives the distance and depth dimension with reference to an object, which are influenced by a motion parallax due to the displacement in movement where an object closer to the driver in the sight ahead of the vehicle appears to move in a greater amount and an object more distant from the driver in the sight ahead of the vehicle appears to move in a smaller amount when the position of the eyes of the driver 300 moves.

In the present embodiment, as illustrated in FIG. 2, a driver camera 150 that monitors the positions of the eyes of the driver 300 (i.e., the location of the viewpoint) is disposed near the rear-view mirror provided for the front windshield 302 of the vehicle 301. In order to monitor the motion of the driver 300 in the up-and-down and right-and-left directions accurately, it is desired that the driver camera 150 be disposed around the median line drawn from the driver 300 who sits in the driver's seat. Moreover, it is desired that the driver camera 150 be disposed, for example, on an upper side so as not to obstruct the view of the driver 300.

The driver camera 150 is a monocular camera that is configured to capture an area where the driver 300 who sits in the driver's seat and is driving the vehicle is expected to move his/her head. In a similar manner to the camera unit 110A and the camera unit 110B provided for the stereo camera 110, the driver camera 150 includes, for example, a lens, an image sensor, and a sensor controller. A stereo camera may be used as the driver camera 150 in order to keep track of the position of the eyes of the driver in the forward and backward directions.

The brightness image data of the images captured by the driver camera 150 is input to image controller 250. The image controller 250 uses the CPU 251 to execute an information-provision control program stored in the ROM 253 or the like, and recognizes the position of the eyes of the driver 300 based on the brightness image data obtained from the driver camera 150. In the present embodiment, the position of the head of the driver 300 is recognized in a simplified manner based on the brightness image data obtained from the driver camera 150, and the position of the eyes of the driver 300 is estimated based on the results of the recognition. Note that any desired known recognition method may be adopted as a method of recognizing the position of the head of the driver 300.

Examples include a method in which a color of a face (skin color) of the driver 300 is determined based on color information obtained from the image data of the driver camera 150 and the part of the skin color image is recognized as the head position of the driver. In this method, a commonly used face recognition process may be used. In this case, if an illuminator is used to emit illumination light in a visible light wavelength band toward the imaging area (in the vicinity of the head of the driver 300) of the driver camera 150, a captured image with a constant quality is obtained without being affected by an imaging environment (for example, difference in intensity of external light), such that it is possible to obtain a stable recognition accuracy without being affected by the imaging environment. However, in the case that an illuminator in a visible light wavelength band is used, it is necessary to take care not to make the driver feel dazzled.

If a thermal imaging device that images far infrared rays (infrared light) is used as the driver camera 150, a captured image (thermography) having detected far infrared rays emitted from the head of driver 300 is obtained; thus, the head position of the driver may be recognized from the captured image.

If an infrared camera that images near infrared rays (infrared light) is used as the driver camera 150, an infrared image having imaged the head of the driver 300 can be obtained without being affected by external disturbance light in the visible light wavelength band; thus, the head position of the driver can be recognized. In this case, if an illuminator is used to emit near infrared light toward the imaging area (vicinity of the head of the driver 300) of the driver camera 150 is used, a captured image (infrared image) with a constant quality can be obtained without being largely affected by an imaging environment (for example, difference in intensity of external light). Accordingly, a stable recognition accuracy can be obtained without being largely affected by the imaging environment. In particular, in the configuration in which an infrared camera and an infrared illuminator are both used, since infrared light invisible to a driver is emitted to the driver, the driver does not feel dazzled. This configuration is more beneficial in this point than the configuration in which a camera to image in a visible light wavelength band and the visible light illuminator are both used.

The head position of the driver 300 may be detected by using detection results of various sensors installed in a driver's seat of the vehicle 301. For example, as disclosed in JP-2005-29040-A or the like, the head position of the driver 300 is detected by, for example, estimating the position of the head of the driver 300 by using one or more of the following sensors: a distance sensor that detects an anteroposterior position of the driver's seat; an angle sensor that detects an angle of the seat back; a pressure sensor that detects a pressing force of the driver against a seating surface and a seat back of the seat; and a pressure sensor that detects a pressing force of the head of the driver against a headrest of the seat. For example, as disclosed in JP-2006-218083-A and the like, the head position of the driver 300 is detected by using a contact sensor that detects that the head of the driver comes into contact with the headrest of the seat and a capacitance sensor that detects in a noncontact manner that the head of the driver comes close to the headrest of the seat.

Figure 8:
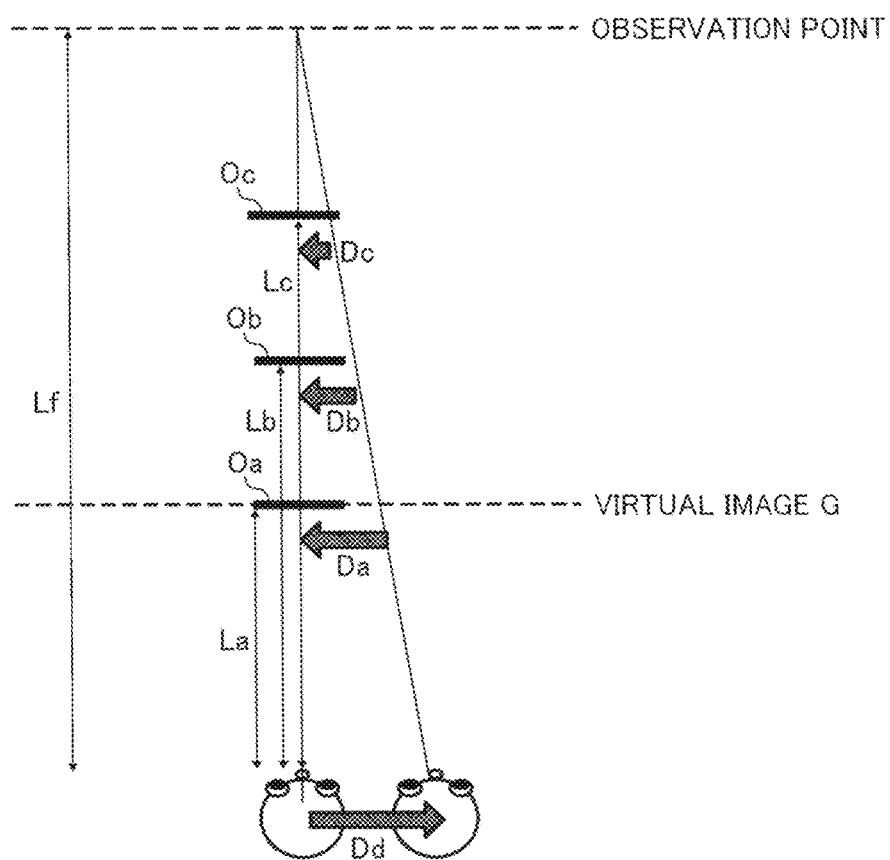
FIG. 8 is a schematic diagram illustrating a method of processing a virtual image with a depth perception that is created by a motion parallax, according to an embodiment of the present invention.

FIG. 8 is a schematic diagram illustrating a method of processing a virtual image G with a depth perception that is created by a motion parallax, according to the present embodiment.

When the head of the driver 300 moves by the amount "Dd" as illustrated in FIG. 8, the position at which an object Oa with a short distance La from the driver 300 is visually recognized moves by the amount "Da", and the position at which an object Ob with a long distance Lb from the driver 300 is visually recognized moves by the amount "Db" that is smaller than "Da". Moreover, the position at which an object Oc with an even longer distance Lc from the driver 300 is visually recognized moves by the amount "Dc" that is even smaller than "Db". Due to the difference in the amounts of movement "Da", "Db", and "Dc" of the positions at which the objects Oa, Ob, and Oc are visually recognized, the driver 300 can perceive that the object Oa, the object Ob, and the object Oc exist with the distance La, distance Lb, and distance Lc, respectively, away from the driver 300.

In the present embodiment, the virtual image G is displayed with the distance of 5 m away from the driver 300, and any of the images on the virtual image G is displayed with the distance of 5 m away from the driver 300. In the present embodiment, a plurality of images on the virtual image G are modified using the motion parallax as described above such that the images are perceived by the driver 300 as if the images are displayed with varying distances.

More specifically, the image controller 250 recognizes the position of the head of the driver 300 at prescribed time intervals based on the brightness image data of the images captured by the driver camera 150. In this embodiment, the prescribed time interval corresponds to one image capturing frame. Then, the image controller 250 calculates the driver's head movement amount Dd that indicates the amount where the head of driver 300 has moved during the prescribed time intervals. In this case, the position at which the virtual image G is visually recognized with the distance of 5 m moves by the amount "Da".

In the present embodiment, the positions of the images that are displayed in the lower display area B are fixed in the display area 700. Accordingly, the position at which the images displayed in the lower display area B are visually recognized moves by the amount "Da", which is the same as the amount in which the virtual image G moves. As a result, the driver 300 perceives the images displayed in the lower display area B with the distance La (5 m).

Meanwhile, the image controller 250 performs, depending on the calculated driver's head movement amount Dd, the display control (motion parallax control) in which the lane indicator image 711 and the following-distance presenting image 712 of the image parts displayed on the upper display area A of the display area 700 of the virtual image G is moved in the display area 700 in the direction opposite to a traveling direction of the head of the driver by a distance Da-Db. With this motion parallax control, regarding the lane indicator image 711 and the following-distance presenting image 712 displayed in the upper display area A, the positions at which the lane indicator image 711 and the following-distance presenting image 712 are visually recognized from the driver 300 are moved by the movement amount Db. As a result, the driver 300 perceives the lane indicator image 711 and the following-distance presenting image 712 displayed at the distance Lb.

In a similar way, the image controller 250 performs the display control (motion parallax control) in which the path indicator image 721, the remaining distance indicator image 722, and the intersection or the like name indicator image 723 of the image parts displayed in the upper display area A of the display area 700 of the virtual image G are moved depending on the calculated driver's head movement amount Dd in the display area 700 in the direction opposite to the traveling direction of the head of the driver by a distance Da-Dc. With this motion parallax control, regarding the path indicator image 721, the remaining distance indicator image 722, and the intersection or the like name indicator image 723 of the image parts displayed in the upper display area A, the positions at which the path indicator image 721, the remaining distance indicator image 722, and the intersection or the like name indicator image 723 are visually recognized from the driver 300 are moved by the movement amount Dc. As a result, the driver 300 perceived the path indicator image 721, the remaining distance indicator image 722, and the intersection or the like name indicator image 723 of the image part displayed at the distance Lc.

As describe above, by the motion parallax control in which the virtual image G is projected while the movement amounts Db and Dc of the view positions of the image parts displayed in the upper display area A are being controlled depending on the driver's head movement amount Dd; thus, the driver 300 perceives such that the lane indicator image 711 and the following-distance presenting image 712 are displayed at a position more distant than the image parts (the road-name display image 701, the speed limit display image 702, the no-passing zone display image 703, and the like) in the lower display area B and such that the course-change-operation instruction images 721, 722, and 723 are displayed at the more distant position. In this manner, it is possible to make the driver 300 perceive as if the image parts on the virtual image G displayed at the same distance were displayed different distances, such that the depth perception of the virtual image G can be created.

Next, the display control will be described in which the perception distance of the image parts displayed in the upper display area A of the display area 700 of the virtual image G is changed depending on the speed of the vehicle 301.

In the case that a motion parallax is used to make the distance to the image displayed by the virtual image G projected from the on-vehicle HUD 200 be perceived to be at the distance different from the distance to the virtual image G, the perception distance is kept constant and is not changed. However, as a result of a study of the inventor of the present invention, it has been revealed that it is useful in many aspects to change the perception distance of the image, depending on movement information such as the speed and the acceleration of the vehicle 301 or position information such as GPS information of the vehicle 301.

For example, in order to quickly and surely provide information to the driver during driving 300, it is effective to display the for-driver information image indicating the information at a position close to an observation area that the driver 300 is observing. Examples of the reason include that the driver 300 observing the observation area can easily notice the for-driver information image and that, since the focal length of the driver 300 focusing on the vicinity of the observation area is close, the for-driver information image can be easily focused on and be quickly visually recognized. However, the driver 300 generally tends to observe a more distant point as the speed of the vehicle 301 is higher. Therefore, the distance of the observation area of the driver 300 can change depending on the speed of the vehicle 301. For this reason, if the perception distance of the for-driver information image is constant, the for-driver information cannot be quickly and surely provided to the driver 300, depending on the speed of the vehicle 301. In such a case, if a display control is performed in which the perception distance of the for-driver information image is set longer as the speed of the vehicle is higher, it is possible to quickly and surely provide the for-driver information to the driver 300 even when the speed of the vehicle changes.

To the contrary, since the driver 300 tends to observe a distant point when the speed of the vehicle 301 is high, the driver 300 tends to increase the speed of the vehicle 301 if the observation point of the driver 300 is moved to a more distant point, the driver 300 tends to decrease the speed of the vehicle 301 if the observation point of the driver 300 is moved to a closer point. Meanwhile, when the perception distance of the for-driver information image changes, the driver 300 often change the distance (focal length) of the observation point so as to follow the for-driver information image. Thus, it is possible to prompt the driver to increase or decrease the speed by changing the perception distance of the for-driver information image. By using this fact, for example, if the display control is performed such that the perception distance of the for-driver information image is increased to prompt the driver 300 to increase the speed of the vehicle 301 when the vehicle 301 is reaching a point like a sag on a highway at which vehicles reduce their speeds to create a congestion, it can ease the congestion. For example, if the display control is performed such that the perception distance of the for-driver information image is decreased to prompt the driver 300 to reduce the speed of the vehicle 301 when the vehicle 301 is running on a gentle downslope or the like and when the speed of the vehicle 301 is increased before the driver 300 notices it, it can contribute the reduction of traffic accidents.

Next, an example of the display control of the present embodiment (hereinafter, the present example is referred to as a "first display control example") will be described.

In the present first display control example, in order to quickly and surely provide the for-driver information to the driver 300 even when the speed of the vehicle 301 is changed, the display control of the for-driver information is performed such that the perception distance of the for-driver information is set longer as the speed of the vehicle is higher and such that the perception distance of the for-driver information is set closer as the speed of the vehicle is lower. Note that, in the following description, a description is given on the following-distance presenting image 712 as an example of the for-driver information.

Figure 9:
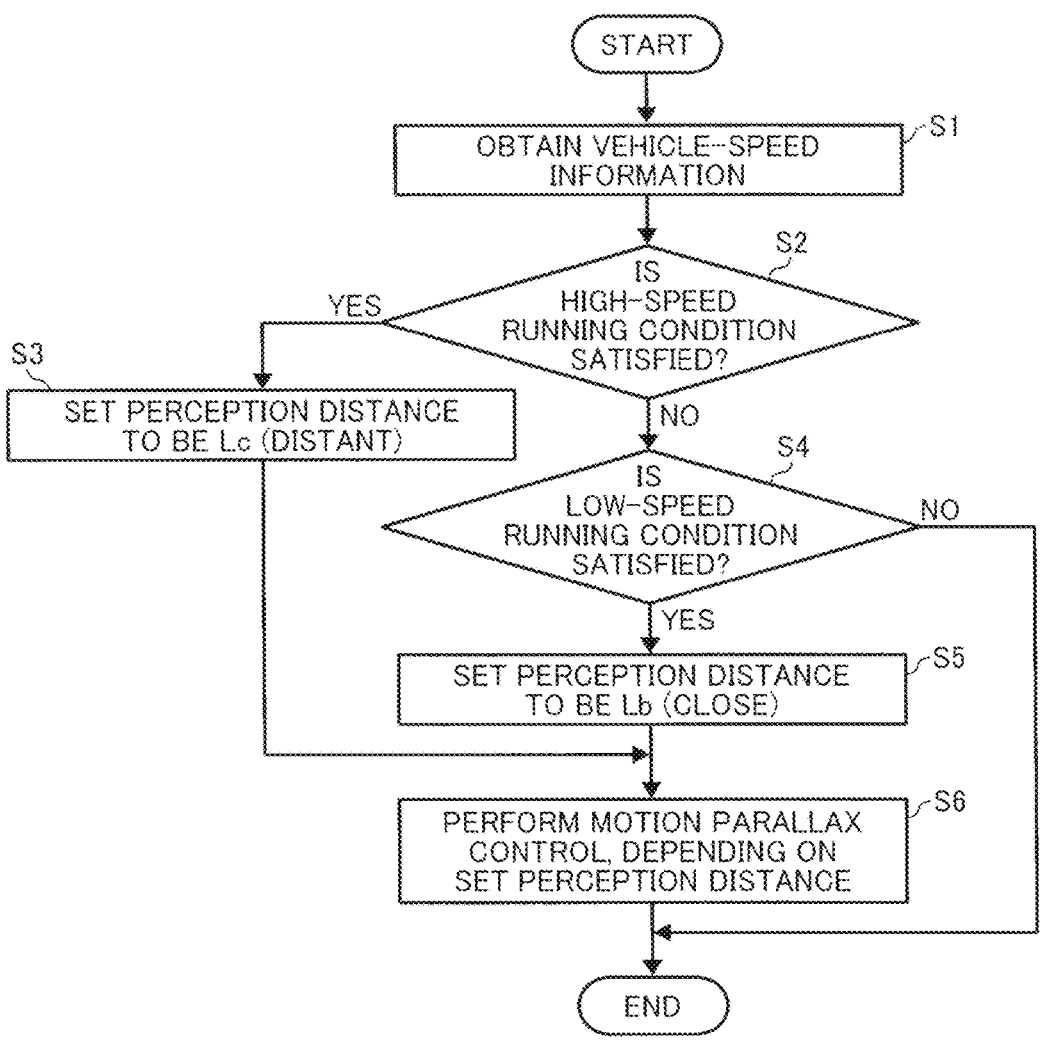
FIG. 9 is a flowchart illustrating operation of controlling display of a following-distance presenting image in a first example.

FIG. 9 is a flowchart illustrating operation of controlling display of the following-distance presenting image 712 in the present first display control example.

Figure 10:
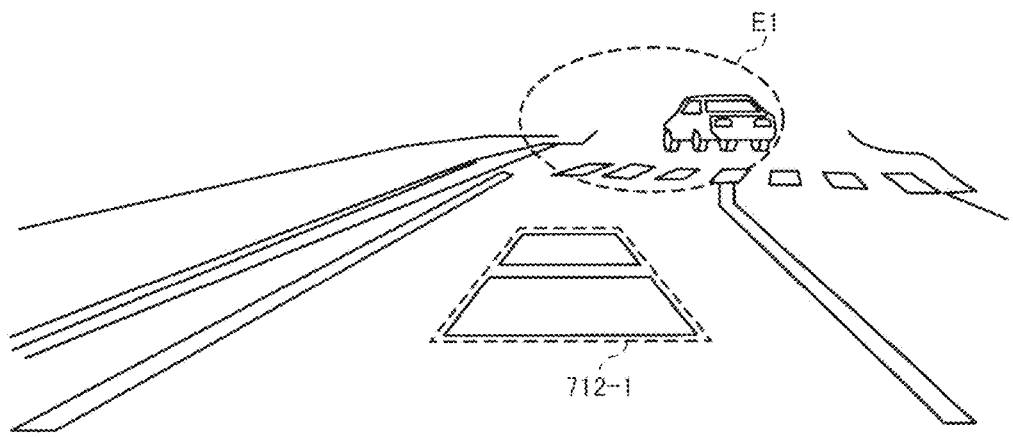
FIG. 10 is a display example of the following-distance presenting image in the case of a low speed vehicle in the first example.

FIG. 10 is a display example of the following-distance presenting image 712 when the speed of the vehicle 301 is low.

Figure 11:
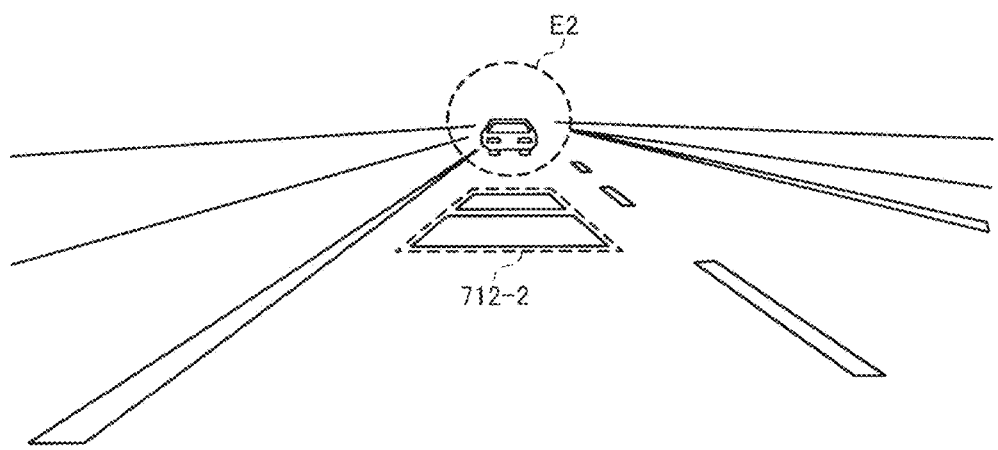
FIG. 11 is a display example of the following-distance presenting image in the case of a high speed vehicle in the first example.

FIG. 11 is a display example of the following-distance presenting image 712 when the speed of the vehicle 301 is high.

Figure 12:
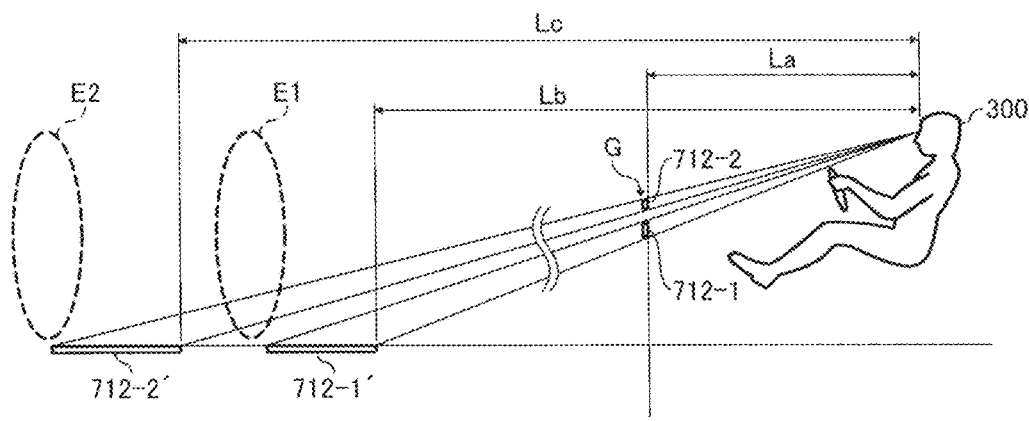
FIG. 12 is an explanatory diagram illustrating the difference in the perception distance of the following-distance presenting image between the display example illustrated in FIG. 10 and the display example illustrated in FIG. 11.

FIG. 12 is an explanatory diagram illustrating the difference in the perception distance of the following-distance presenting image 712 between the display example illustrated in FIG. 10 and the display example illustrated in FIG. 11.

In the present first display control example, after the image controller 250 obtains the vehicle-speed information of the vehicle 301 by obtaining CAN information from the sensor device 500 (step S1), the image controller 250 determines whether the information satisfies a predetermined high-speed running condition or not, based on the vehicle-speed information of the vehicle 301 (step S2). A condition is appropriately set as the predetermined high-speed running condition, with which condition it can be determined that the vehicle speed is so high that the driver 300 observes a distant observation area E2. Examples of the condition include a condition that the vehicle speed is greater than a predetermined threshold and a condition that the vehicle speed is kept greater than a predetermined threshold for more than a specified time.

If the predetermined high-speed running condition is satisfied (step S2: Yes), the image controller 250 determines that the driver 300 is observing the distant observation area E2, and the image controller 250 performs the display control such that the perception distance, of the following-distance presenting image 712, due to motion parallax is set to the long distance Lc as illustrated in FIG. 11 and FIG. 12 (steps S3 and S6). Specifically, the display control (motion parallax control) is performed such that the movement amount, of the position at which the following-distance presenting image 712 displayed in the upper display area A of the virtual image G is visually recognized, depending on the driver's head movement amount Dd calculated based on the brightness image data of the captured image captured by the driver camera 150 is the movement amount Dc corresponding to the perception distance Lc. With this operation, the following-distance presenting image 712 is displayed, as illustrated in FIG. 11 and FIG. 12, at a position close to the observation area E2 that the driver 300 is observing and at the perception distance close to the distance to the observation area E2, and as a result, the following-distance information (for-driver information) can be quickly and surely provided to the driver during driving 300.

To the contrary, if the predetermined high-speed running condition is not satisfied (step S2: No), the image controller 250 determines based on the vehicle-speed information of the vehicle 301 whether the predetermined low-speed running condition is satisfied (step S4) or not. A condition is appropriately set as a predetermined low-speed running condition, with which condition it can be determined that the vehicle speed is so low that the driver 300 observes the close observation area E1, Examples of the condition include a condition that the vehicle speed is lower than a predetermined threshold (the threshold is set at least equal to or lower than the value of the threshold of the above high-speed running condition) and a condition that the vehicle speed is kept equal to or lower than the predetermined threshold for more than a specified time.

If the predetermined low-speed running condition is satisfied (step S4: Yes), the image controller 250 determines that the driver 300 is observing the close observation area E1, and the image controller 250 performs the display control such that the perception distance, of the following-distance presenting image 712, due to motion parallax is the close distance Lb as illustrated in FIG. 10 and FIG. 12 (steps S5 and S6). Specifically, the display control (motion parallax control) is performed such that the movement amount of the position, at which the following-distance presenting image 712 displayed in the upper display area A of the virtual image G is visually recognized and which depends on the driver's head movement amount Dd calculated based on the brightness image data of the captured image captured by the driver camera 150, is the movement amount Db corresponding to the perception distance Lb. With this operation, the following-distance presenting image 712 is displayed, as illustrated in FIG. 10 and FIG. 12, at a position close to the observation area E1 that the driver 300 is observing and at the perception distance close to the distance to the observation area E1, and as a result, the following-distance information (for-driver information) can be quickly and surely provided to the driver during driving 300.

Here, in the present first display control example, when the perception distance of the following-distance presenting image 712 is switched between the close distance Lb illustrated in FIG. 10 and the distant distance Lc illustrated in FIG. 11, the time required to switch is set to one second or longer. That is, for example, in the case that the perception distance is switched from the close distance Lb illustrated in FIG. 10 to the distant distance Lc illustrated in FIG. 11, the display control is performed to change the perception distance so slowly that it takes one second or longer for the perception distance of the following-distance presenting image 712 becomes from Lb to Lc. If the time is less than one second, the driver perceives as if the following-distance presenting image 712 moved instantaneously from the position of the perception distance Lb to the position of the perception distance Lc, and a visual stimulus is unnecessarily given to the driver during driving. In order to avoid such a visual stimulus, the time taken to switch the perception distances is preferably one second or longer.

As described above, with the present first display control example, if the speed of the vehicle 301 is high, the observation area E2 of the driver 300 becomes more distant, and the perception distance Lc of the following-distance presenting image 712 becomes longer, and if the speed of the vehicle 301 is low, the perception distance Lc of the following-distance presenting image 712 becomes shorter as the observation area E1 of the driver 300 becomes closer. As a result, even if the distance of the observation area that the driver 300 observes changes along with the change in the speed of the vehicle 301, the following-distance presenting image 712 can be displayed in the vicinity of the observation area, and the following-distance information can be quickly and surely provided to the driver 300.

Note that, although the present first display control example is an example in which the perception distance of the following-distance presenting image 712 is changed in two steps, the perception distance of the following-distance presenting image 712 may be changed in three steps, depending on the speed of the vehicle 301. In particular, in an aspect in which the display control is performed such that the perception distance of the following-distance presenting image 712 is changed continuously depending on the speed of the vehicle 301, even if the distance of the observation area that the driver 300 observes changes along with the speed of the vehicle 301, the following-distance presenting image 712 can be displayed in the vicinity of the observation area. Accordingly, the following-distance information can be quickly and surely provided to the driver 300.

Although the present first display control example is an example in which the perception distance of the following-distance presenting image 712 is changed depending on the speed of the vehicle 301, a similar effect can be achieved by changing the perception distance of the following-distance presenting image 712, depending on the position information of the vehicle 301.

Specifically, for example, the display control is performed such that if it is determined, based on the route navigation information input from the vehicle navigation device 400, that the vehicle 301 is running on a highway or the like on which vehicle should run at a high speed, the perception distance Lc of the following-distance presenting image 712 is set longer as illustrated in FIG. 11, and if it is determined that the vehicle 301 is running on other roads (urban roads on which vehicles are to run generally at a low speed), the perception distance Lb of the following-distance presenting image 712 is set shorter as illustrated in FIG. 10.

However, if determination is made depending only on the position information, the display control can be performed such that the perception distance of the following-distance presenting image 712 is set longer even when the vehicle is running actually at a low speed due to a congestion on a highway or the like; thus, the advantage that the following-distance information is quickly and surely provided cannot be sufficiently provided. If determination is made depending only on the vehicle-speed information, the perception distance of the following-distance presenting image 712 may be frequently switched in the situation that the vehicle speed is frequently increased and decreased near the threshold, and the information cannot be quickly and surely provided to the driver against the expectation. Therefore, it is effective to change the perception distance of the following-distance presenting image 712 by using both of the position information and the vehicle-speed information.

Next, another example of the display control of the present embodiment (hereinafter, the present example is referred to as a "second display control example") will be described.

In the present second display control example, the display control is performed such that the perception distance of the following-distance presenting image 712 is set longer when the vehicle 301 is reaching a congestion generation position such as a sag on a highway on which vehicles reduce their speeds to create a congestion.

Figure 13:
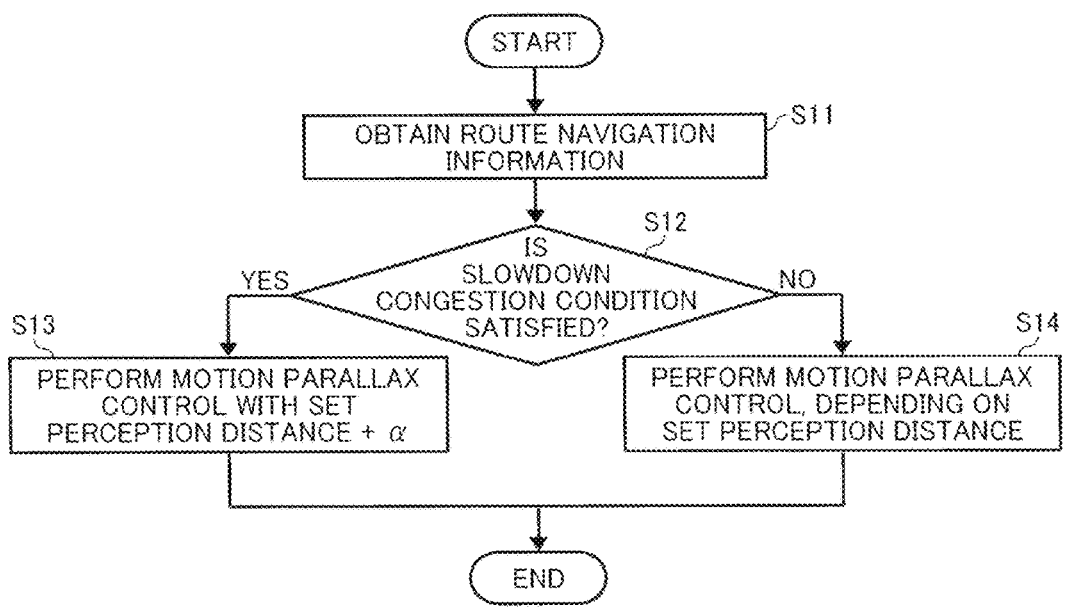
FIG. 13 is a flowchart illustrating operation of controlling display of a following-distance presenting image in a second example.

FIG. 13 is a flowchart illustrating a flow of a display control of the following-distance presenting image 712 in the present second display control example.

Figure 14A:
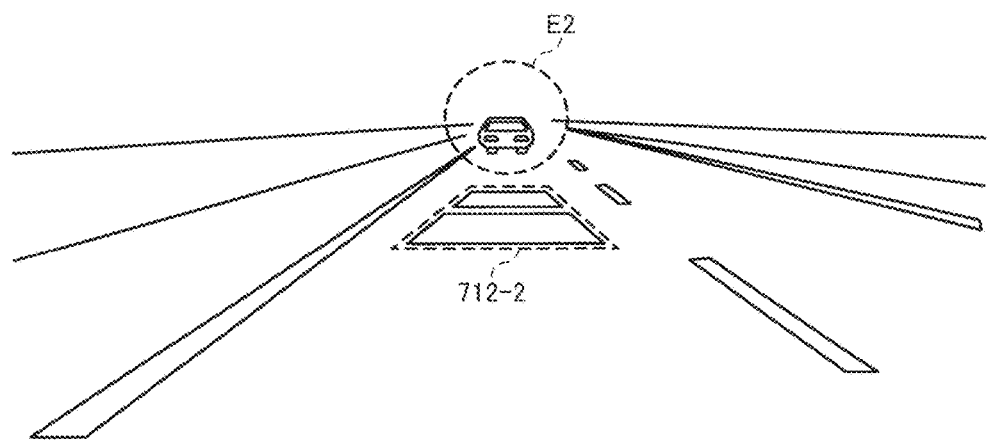
FIG. 14A is a display example of a normal following-distance presenting image when the vehicle is running on a highway.
Figure 14B:
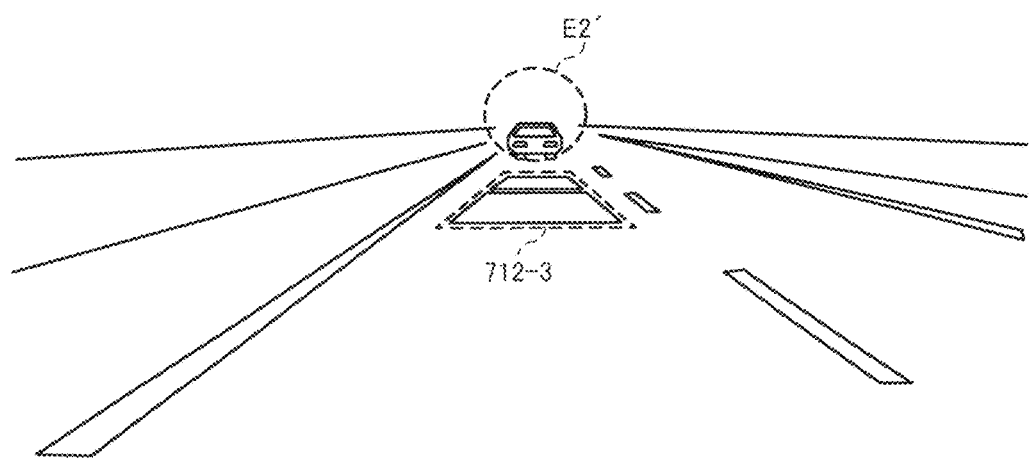
FIG. 14B is a display example of the following-distance presenting image when the vehicle is passing through a sag (where congestion is generated) on a highway.

FIG. 14A is a display example of the normal following-distance presenting image 712 when the vehicle 301 is running on a highway, and FIG. 14B is a display example of the following-distance presenting image 712 when the vehicle is passing through a sag (congestion generation position) on a highway.

In the present second display control example, the image controller 250 obtains the route navigation information (the position information of the vehicle 301) input from the vehicle navigation device 400 (step S11), and the image controller 250 determines based on the route navigation information whether a predetermined slowdown congestion condition (slowdown warning condition) is satisfied (step S12) or not. Examples of the predetermined slowdown congestion condition includes, for example, a condition that a current position of the vehicle 301 is at a sag on a highway, at which a congestion is likely to be generated by speed reduction of passing vehicles.

If the predetermined slowdown congestion condition is satisfied (step S12: Yes), the image controller 250 performs the display control, in order to prevent or reduce reduction in the vehicle speed or to prompt increase in the vehicle speed, such that the perception distance, of the following-distance presenting image 712, due to motion parallax is set at the distance in which a predetermined distance is added to the currently set perception distance. For example, when the vehicle 301 is running on a highway, the display control is performed such that the perception distance, of the following-distance presenting image 712, due to motion parallax is set at the distant distance Lc illustrated in FIG. 14A in the same manner as in the above first display control example. In this situation, if the predetermined slowdown congestion condition is satisfied (step S12: Yes), the display control is performed such that the perception distance, of the following-distance presenting image 712, due to motion parallax is changed from Lc to Lc+. With this, the driver 300 changes the distance of recognition point (focal length) such that the perception distance for-driver image that has changed from Lc to Lc+, to increase the speed of the vehicle 301.

With the present second display control example, in the case that the vehicle 301 is reaching a congestion generation position such as a sag or the like on a highway, at which a congestion is likely to be generated due to speed reduction of passing vehicles, the predetermined slowdown congestion condition is satisfied, and then a display control is performed in which the perception distance of the following-distance presenting image 712 is set longer. This operation prompts the driver 300 to increase the speed of the vehicle 301, and reduction in the speed of the vehicle 301 is thus prevented or reduced or the speed of the vehicle 301 is thus increased; therefore, the generation of congestion at the congestion generation position is prevented or reduced, or elimination of an existing congestion at the congestion generation position is accelerated.

Note that the predetermined slowdown congestion condition is not satisfied any longer (step S12: No), the display control is performed with the perception distance, of the following-distance presenting image 712, due to motion parallax being the previous perception distance (step S14).

Also in the present second display control example, when the perception distance of the following-distance presenting image 712 is switched, the time required to switch the perception distances is preferably one second or longer in the same manner as in the first display control example.

Note that, contrary to the present second display control example, it is possible to perform the display control such that the perception distance of the following-distance presenting image 712 is set closer to lead the observation area of the driver to a closer position, thereby prompting the driver 300 to reduce the acceleration of the vehicle 301 or to reduce the speed of the vehicle. For example, if such a display control is performed in the case that the vehicle 301 is running at a vehicle acceleration point such as a gentle downslope, at which the vehicle speed is increased before the driver 300 notices it, it is also possible to prompt the driver 300 to reduce the acceleration of the vehicle 301 or to reduce the speed of the vehicle and thus to contribute to prevention or reduction of traffic accidents due to excessive speed. Such a display control is achieved by the image controller 250 recognizing, based on the route navigation information (the position information of the vehicle 301) input from the vehicle navigation device 400, that the vehicle 301 is passing through a vehicle acceleration point as described above.

In the present second display control example, an example is described in which the perception distance of the following-distance presenting image 712 is changed depending on the position information of the vehicle 301; however, a similar effect can be achieved by changing the perception distance of the following-distance presenting image 712, depending on the movement information such as the speed of the vehicle 301. Specifically, for example, in the case that the display control is performed, based on the vehicle-speed information obtained from the sensor device 500, such that the perception distance of the following-distance presenting image 712 is increased when the speed of the vehicle becomes lower than a prescribed speed and that the speed of the vehicle 301 is reduced at a congestion generation position such as a sag on a highway at which a congestion is likely to be generated due to speed reduction of passing vehicles, it is possible to prompt the driver 300 to increase the speed of the vehicle 301, thereby easing the congestion.

Next, still another example of the display control of the present embodiment (hereinafter, the present example is referred to as a "third display control example") will be described.

In the present embodiment, the following-distance presenting image 712, whose perception distance is changed based on the vehicle-speed information of the vehicle 301 (movement information), the route navigation information (position information), and the like, is displayed to be superimposed on the actual road surface (traveling surface) ahead of the vehicle. In the case that the perception distance of the for-driver information image virtually disposed on a road surface is increased, if the display position of the for-driver information image is moved further upward, it makes the driver 300 easily recognize that the distance of the for-driver information image becomes longer along the actual road surface. Therefore, also in the above various display controls, when the perception distance of the following-distance presenting image 712 is increased, not only the movement amount of the position at which the following-distance presenting image 712 is visually recognized is changed depending on the driver's head movement amount Dd, but also the position at which the following-distance presenting image 712 is visually recognized is set to a higher position.

Here, in the case that the height of the position at which the for-driver information image is visually recognized is changed, the range in which the height can be changed is limited to the display area 700 of the virtual image G of the on-vehicle HUD 200. Because the position of the display area 700 of the virtual image G is fixed, in order to change the height of the position at which the for-driver information image is visually recognized, the relative position of the for-driver information image with respect to the display area 700 is changed. The length of the display area 700 in the height direction (the angle of view in the vertical direction) is difficult to increase in many cases from the point of view of downsizing of the on-vehicle HUD 200 or the like. Therefore, when the range of the perception distance of the for-driver information image is distant, it is impossible in some cases to change the height of the for-driver information image in accordance with the change in the perception distance. To the contrary, if the for-driver information image is made smaller, it is possible to secure the range in which the height of the for-driver information image is changed; however, a problem occurs in which visibility of the for-driver information image is accordingly lowered.

To address this issue, in the present third display control example, when the perception distance of the for-driver information image is changed, a control is performed in which the position of the display area 700 instead of changing the relative position of the for-driver information image in the display area 700, or in addition to changing the relative position.

FIG. 15 is a flowchart illustrating operation of controlling display of the following-distance presenting image 712 in the present third display control example.

Figure 16A:
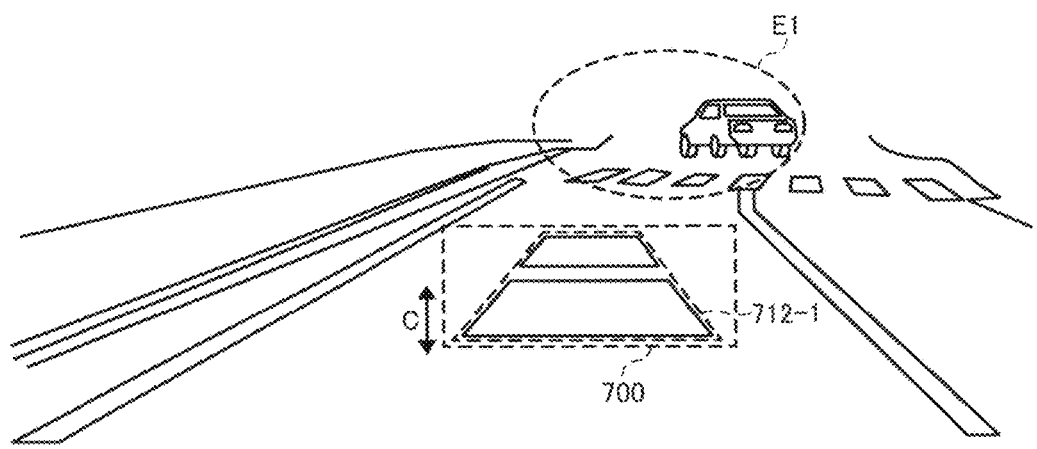
FIG. 16A is a display example of the following-distance presenting image in the case of a low speed vehicle.
Figure 16B:
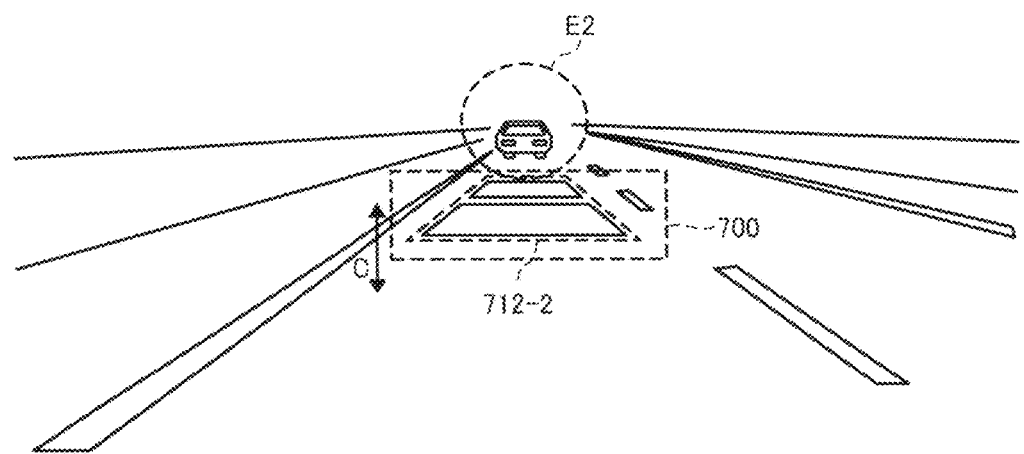
FIG. 16B is a display example of the following-distance presenting image in the case of a high speed vehicle.

FIG. 16A is a display example of the following-distance presenting image 712 when the speed of the vehicle 301 is low. FIG. 16B is a display example of the following-distance presenting image 712 when the speed of the vehicle 301 is high.

In the present third display control example, in the same manner as in the above first display control example, when the image controller 250 obtains the vehicle-speed information of the vehicle 301 (step S21), the image controller 250 determines, based on the vehicle-speed information of the vehicle 301, whether the predetermined high-speed running condition is satisfied (step S22) or not. Then, if the predetermined high-speed running condition is satisfied (step S22: Yes), the display control is performed such that the perception distance, of the following-distance presenting image 712, due to motion parallax is set to the distant distance Lc as illustrated in FIG. 16B (steps S23 and S26). At this time, in the present third display control example, not only the display control (motion parallax control) is performed such that the movement amount, of the position at which the following-distance presenting image 712 displayed in the upper display area A of the virtual image G is visually recognized, depending on the driver's head movement amount Dd calculated based on the brightness image data of the captured image captured by the driver camera 150, is the movement amount Dc corresponding to the perception distance Lc, but also a display control (display area control) is performed in which the position of the display area 700 is moved upward.

Examples of the method of the display area control for moving the position of the display area 700 include, for example, a method in which a reflection surface angle of the projector mirror 211 provided on the on-vehicle HUD 200 is changed. Specifically, the projector mirror 211 is rotatably moved about a rotation axis parallel to a reflection surface of the projector mirror 211 to change the reflection surface angle of the projector mirror 211 so that the projected display area 700 of the virtual image G is moved upward (in the direction of arrow C in FIGS. 16A and 16B). The present third display control example employs this method, and a drive motor of the projector mirror 211 is controlled based on the set perception distance of the following-distance presenting image 712 so that the reflection surface angle of the projector mirror 211 is changed to move the position of the display area 700 upward. As a result, the position at which the following-distance presenting image 712 is visually recognized can be moved upward, as illustrated in FIG. 16B, to the position at which the position of the display area 700 cannot be displayed if the display is kept as illustrated in FIG. 16A. Thus, even in the case that the following-distance presenting image 712 cannot be displayed at the position close to the observation area E2, which the driver 300 is observing, when the position of the display area 700 is kept as illustrated in FIG. 16A, the following-distance presenting image 712 can be displayed at the position close to the observation area E2 so that the following-distance information (for-driver information) can be quickly and surely provided to the driver during driving 300.

If the predetermined low-speed running condition is satisfied (step S24: Yes), the display control is performed such that the perception distance, of the following-distance presenting image 712, due to motion parallax is set to the close distance Lb as illustrated in FIG. 16A (steps S25 and S26). Also in this case, in the present third display control example, not only the motion parallax control is performed, but also the display area control is performed to move the position of the display area 700 upward. Specifically, the drive motor of the projector mirror 211 is controlled, based on the set perception distance of the following-distance presenting image 712, to change the reflection surface angle of the projector mirror 211 so that the position of the display area 700 is moved downward. As a result, the position at which the following-distance presenting image 712 is visually recognized can be moved, as illustrated in FIG. 16A, downward to the position at which the position of the display area 700 cannot be displayed if the display is kept as illustrated in FIG. 16B. Thus, even in the case that the following-distance presenting image 712 cannot be displayed at the position close to the observation area E1 when the position of the display area 700 is kept as illustrated in FIG. 16B, the following-distance presenting image 712 can be displayed at the position close to the observation area E1 so that the following-distance information (for-driver information) can be quickly and surely provided to the driver during driving 300.

Note that, in the above embodiment, the information of the vehicle 301 used to change the perception distance of the following-distance presenting image 712 is the vehicle-speed information and the position information of the speed of the vehicle 301; however, the perception distance of the for-driver information image may be changed depending on other information such as the acceleration information (movement information) of the vehicle 301 if it provides an advantageous effect.

In the present embodiment, the HUD 230 serving as an image-light projection device is used as the image display, which image-light projection device projects the image light to the light transmission member so as to display the for-driver information image in the predetermined display area 700 that the driver 300 visually recognizes ahead in a mobile object traveling direction via the light transmission member such as the windshield 302; however, the image display may be a device that displays the for-driver information image on the display device such as a liquid crystal display and an organic EL display disposed on the dashboard or the like near the driver's seat.

Note that, also in the above information provision device, an abnormality may occur in some cases in the detection result of the viewpoint detector due to various causes such as erroneous detection of the viewpoint detector caused by a failure of the viewpoint detector or the imaging environment. If an abnormality occurs in the detection result of the viewpoint detector, the display position of an image can abnormally change, for example; thus, not only the visibility of the image can become low, but also unnecessary stress can be given to the driver.

To address this issue, it is preferable to provide an information provision device that can secure visibility of the for-driver information image and reduce unnecessary stress that can be given to the driver, even if an abnormality occurs in the detection result of the viewpoint detector.

Figure 17:
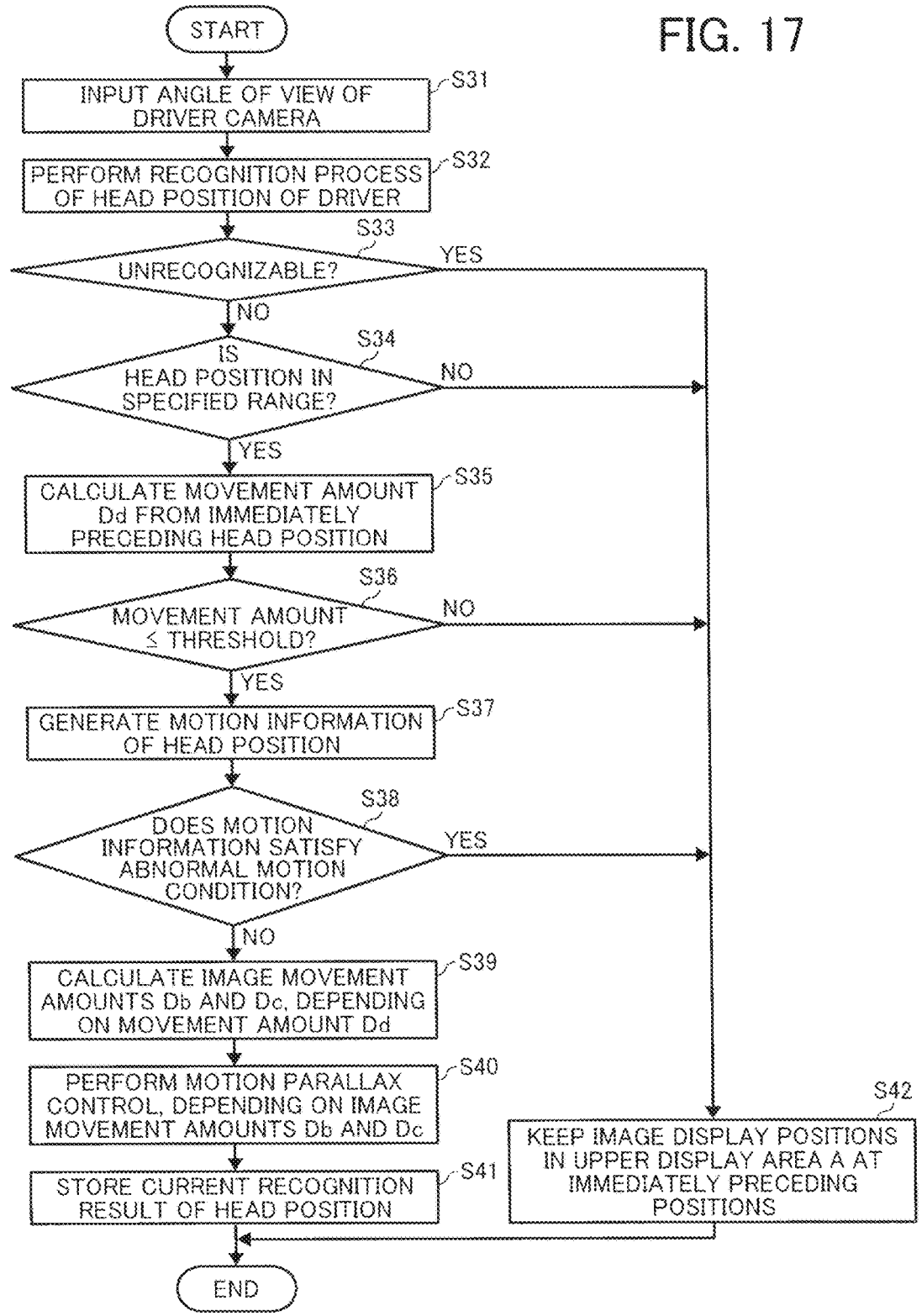
FIG. 17 is a flowchart illustrating operation of handling abnormality in a first example.
Figure 18:
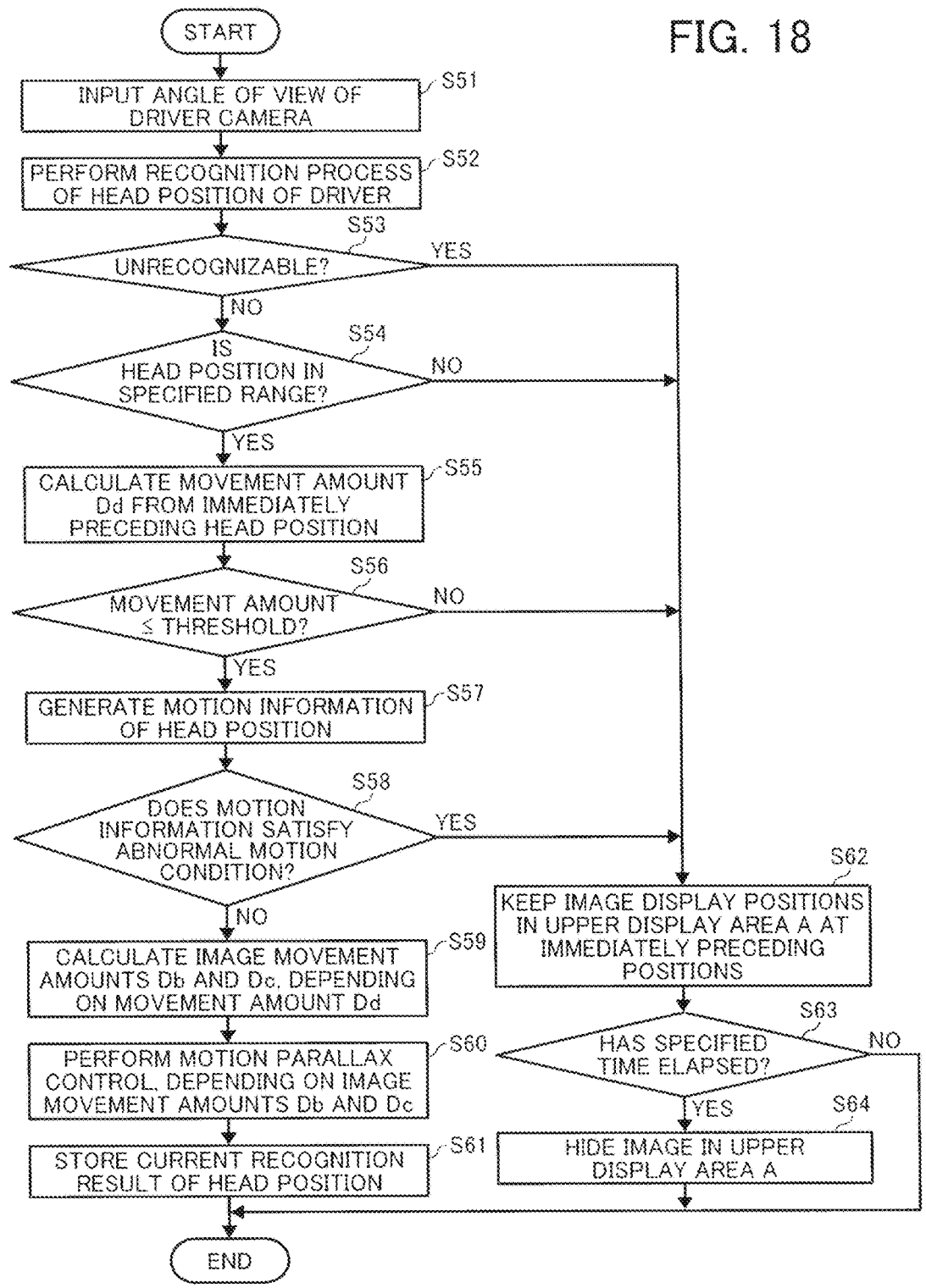
FIG. 18 is a flowchart illustrating operation of handling abnormality in a second example.
Figure 19:
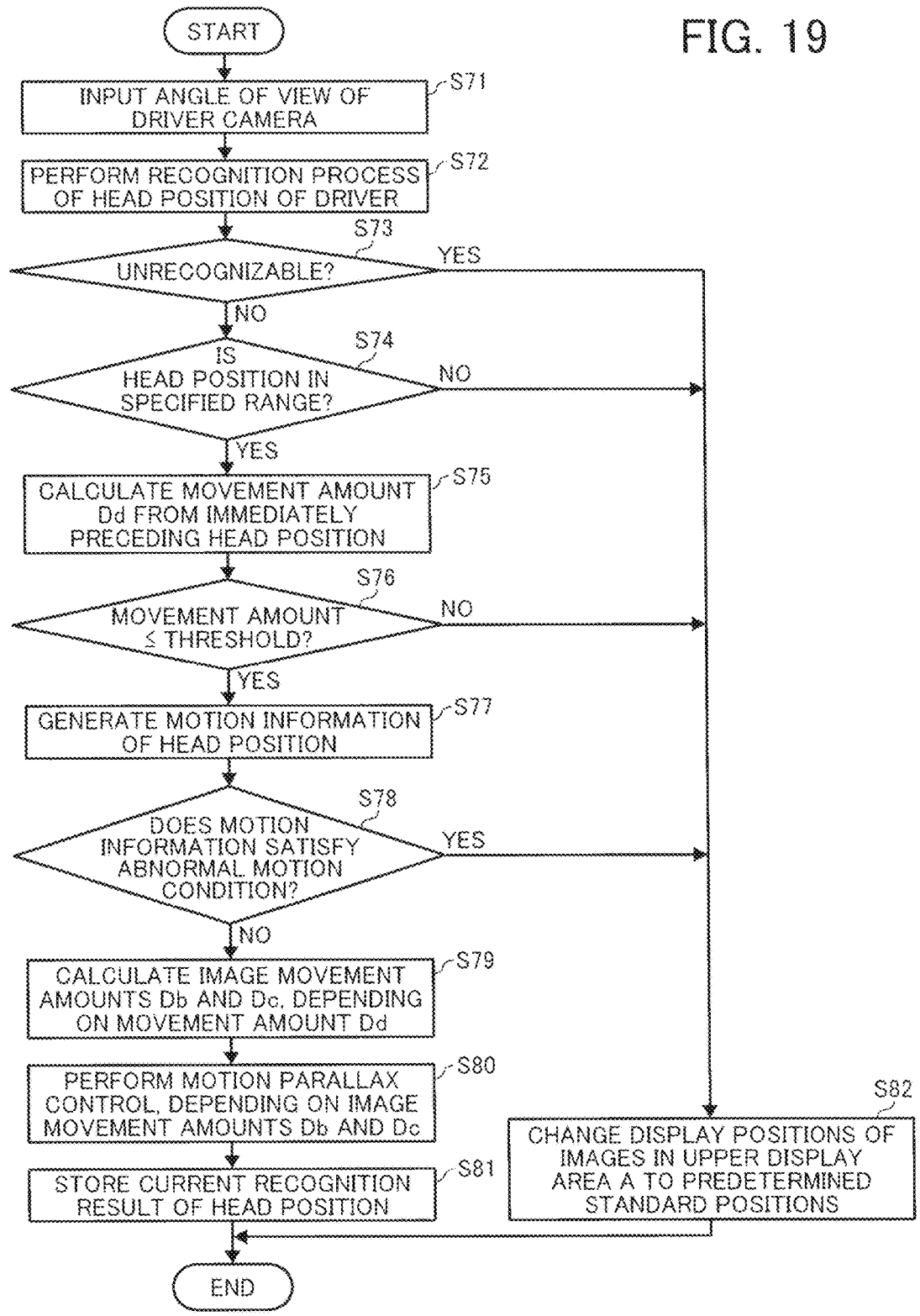
FIG. 19 is a flowchart illustrating operation of handling abnormality in a third example.

Referring to FIGS. 17 to 19, a description will be given to an abnormality handling process that deals with an abnormality occurring in a recognition process, of the head position of the driver 300, based on the captured image of the driver camera 150.

In the present embodiment, the sense of distance and the depth perception of the virtual image G are created as described above by using the motion parallax by projecting the virtual image G while controlling, depending on the driver's head movement amount Dd, the movement amounts Db and Dc of the positions at which the image parts 711, 712, 721, 722, and 723 displayed in the upper display area A are visually recognized. In this process, if there is an abnormality in the recognition result of the driver's head movement amount Dd, which is calculated from the result of recognition, of the head position of the driver 300, based on the brightness image data from the driver camera 150, it is impossible to appropriately control the movement amounts Db and Dc of the positions at which the image parts 711, 712, 721, 722, and 723 are visually recognized.

For example, if the head of the driver 300 is irradiated with a strong sunlight, the received light amounts of the light receiving elements on the image sensor of the driver camera 150 are saturated, and the brightness image data with so-called halation are imaged in some cases. Such brightness image data include many pixels having the maximum value (white), and there is no brightness difference. In such case, there sometimes occurs incorrect recognition of the head position of the driver 300, or the head position of the driver 300 is not always recognized. Such an incorrect recognition or unrecognizability is difficult to quickly avoid even if an automatic exposure control operates on the driver camera 150.

When the incorrect recognition of the head position occurs, the head position is sometimes recognized to be at a different position that is distant from the head position at which the head position is recognized immediately before and to which the head position cannot move in a period of time corresponding to the sampling period (the time period between imaging frames if the head position is recognized at every imaging frame) with which the brightness image data are obtained to recognize the head position. Alternatively, if the incorrect recognition of the head position occurs, the head position is recognized in some cases as if the head position expected from the continuously obtained recognition results of the head positions moved in a normally unconceivable way. If the movement amounts Db and Dc of the positions at which the image parts 711, 712, 721, 722, and 723 displayed in the upper display area A are visually recognized are controlled depending on the driver's head movement amount Dd calculated based on the recognition result of the head position that is incorrectly recognized as described above, the sense of distance and the depth perception due to the motion parallax cannot be obtained any longer. In addition to that, the display positions of the image parts 711, 712, 721, 722, and 723 are abnormally changed, and as a result, the visibility of the image parts is lowered, or unnecessary stress is given to the driver during driving 300.

In the case that unrecognizability of the head position occurs, the image parts 711, 712, 721, 722, and 723 are displayed abnormally; thus, the visibility of the image parts can be lowered, or unnecessary stress can be given to the driver during driving 300.

To address these issues, in the present embodiment, in the case that an abnormality such as incorrect recognition and unrecognizability occurs to the recognition result, of the head position, based on the captured image of the driver camera 150, the movement amounts Db and Dc of the positions at which the image parts 711, 712, 721, 722, and 723 are visually recognized are not controlled depending on the driver's head movement amount Dd calculated from such recognition results, but a predetermined abnormality handling process is performed.

Hereinafter, an example of the abnormality handling process in the present embodiment (hereinafter, the present example is referred to as a "first abnormality handling process example") will be described.

In the present first abnormality handling process example, an abnormality handling process is performed in which, when the recognition result, of the head position, based on the captured image of the driver camera 150 satisfies a predetermined abnormal condition, the display positions of the image parts 711, 712, 721, 722, and 723 displayed in the upper display area A are kept at the immediately preceding display positions.

FIG. 17 is a flowchart illustrating a flow of a process in the first abnormality handling process example.

After the captured image data are input from the driver camera 150 (step S31), the image controller 250 recognizes, as described above, the head position of the driver 300, based on the brightness image data of the captured image captured by the driver camera 150 (step S32). Then, if the head position cannot be recognized (step S33: Yes), the image controller 250 determines that the abnormal condition is satisfied and performs the abnormality handling process in which the display positions of the image parts 711, 712, 721, 722, and 723 displayed in the upper display area A are kept at the immediately preceding display positions (step S42). With this operation, even if the head position of the driver is unrecognizable due to some causes, it is possible to avoid the situation that the visibility of the image parts is lowered or unnecessary stress is given to the driver during driving 300 due to abnormally change in the display positions of the image parts.

If the head position is recognized (step S33: No), the image controller 250 next determines whether the recognized head position is in a specified range (step S34) or not. This operation is for extracting an abnormal recognition result that the following position is recognized as the head position: (i) a position out of an imaging area of the driver camera 150; or (ii) a position at which the head position of the driver during driving 300 cannot be located, and the specified range is appropriately set in such a range that those recognition results can be extracted. If the image controller 250 determines that the recognized head position is out of the specified range (step S34: No), the image controller 250 determines that the abnormal condition is satisfied and performs the abnormality handling process in which the display positions of the image parts 711, 712, 721, 722, and 723 displayed in the upper display area A are kept at the immediately preceding display positions (step S12). With this operation, even if an abnormal recognition result of the head position of the driver occurs due to some causes, it is possible to avoid the visibility of the image parts from being lowered and unnecessary stress given to the driver during driving 300.

If the image controller 250 determines that the recognized head position is within the specified range (step S34: Yes), the image controller 250 reads out from the RAM 252 the recognition result of the head position when the immediately preceding motion parallax control was performed, and the image controller 250 calculates the distance between the read-out immediately preceding head position and the currently recognized head position as the driver's head movement amount Dd that is the distance the head of the driver travels from the time when the immediately preceding motion parallax control is performed and to the time of the current motion parallax control (step S35). Then, the image controller 250 determines whether the calculated driver's head movement amount Dd is equal to or less than a predetermined threshold (step S36) or not. This step is for extracting the abnormal recognition result in which a position that can be obtained only when the head is moving at an unusually high speed has been recognized as the head position, and the predetermined threshold is appropriately set so that such an abnormal recognition result can be extracted.

Then, if the image controller 250 determines that the calculated driver's head movement amount Dd is greater than the predetermined threshold (step S36: No), the image controller 250 determines that the abnormal condition is satisfied, and the image controller 250 performs the abnormality handling process in which the display positions of the image parts 711, 712, 721, 722, and 723 displayed in the upper display area A are kept at the immediately preceding display positions (step S42). With this operation, even if an abnormal recognition result of the head position of the driver occurs due to some causes, it is possible to avoid the visibility of the image parts from being lowered and unnecessary stress given to the driver during driving 300.

Next, if the image controller 250 determines that the calculated driver's head movement amount Dd is equal to or less than the predetermined threshold (step S36: Yes), the image controller 250 uses as the motion information of the head the recognition results in a predetermined period including the current recognition result of the head position (for example, the recognition results for the latest 10 frames) (step S37), and it is determined whether the motion information satisfies the abnormal motion condition (step S38) or not. This operation is for extracting a motion of the head recognized from the recognized head positions as an abnormal recognition result of the head position if the motion exhibits a movement that cannot be exhibited as a normal behavior. Examples of such an abnormal motion include, for example, an motion in which the head position reciprocally moves at a very short cycle (for example, a cycle corresponding to one or two frames), and a condition is appropriately set as the abnormal motion condition, with which condition an abnormal motion can be extracted. Note that the image controller 250 stores the recognition result of the head positions in a predetermined period (for example, the period corresponding to the latest 10 frames) in the RAM 252, and these recognition results are read out from the RAM 252 to generate the motion information.

Then, if the image controller 250 determines that the generated motion information satisfies a predetermined abnormal motion condition (step S38: Yes), the image controller 250 determines that the abnormal condition is satisfied, and the image control performs the abnormality handling process in which the display positions of the image parts 711, 712, 721, 722, and 723 displayed in the upper display area A are kept at the immediately preceding display positions (step S42). With this operation, even if an abnormal recognition result of the head position of the driver occurs due to some causes, it is possible to avoid the visibility of the image parts from being lowered and unnecessary stress given to the driver during driving 300.

Meanwhile, if the image controller 250 determines that the generated motion information does not satisfy the predetermined abnormal motion condition (step S38: No), the image controller 250 determines that the current recognition result of the head position is a normal recognition result, which does not satisfy any of the abnormal conditions. Then, depending on the driver's head movement amount Dd calculated in the above step S5, the image movement amounts Db and Dc of the image parts 711, 712, 721, 722, and 723 displayed in the upper display area A in the display area 700 of the virtual image G are calculated (step S39), and a display control (motion parallax control) is performed in which the image parts are moved corresponding to the calculated image movement amounts Db and Dc (step S40). This operation can make the driver 300 visually recognize as if the image parts 711, 712, 721, 722, and 723 displayed in the upper display area A were displayed at the distance away from the perception distance of the virtual image G. Note that the normal recognition result of the head position is stored in the RAM 252 (step S41).

With the present first abnormality handling process example, if the current recognition result of the head position satisfies any one of the above abnormal conditions, the abnormality handling process is performed instead of the motion parallax control, in which abnormality handling process the image parts 711, 712, 721, 722, and 723 displayed in the upper display area A are kept at the immediately preceding display positions. With this operation, even if the head position of the driver cannot be recognized or an abnormal recognition result of the head position of the driver occurs due to some causes, it is possible to avoid the visibility of the image parts from being lowered and unnecessary stress given to the driver during driving 300.

Note that, in the case that the incorrect recognition or the unrecognizability of the head position is created in association with a temporary change in the imaging environment, for example, in the case that the head of the driver 300 is irradiated with a strong sunlight, the recognition result of the head position will be able to obtained after a short time, for example, after the imaging environment recovers. In this case, in the present first abnormality handling process example, none of the abnormal conditions is satisfied any longer. The motion parallax control is performed again on the image parts 711, 712, 721, 722, and 723 displayed in the upper display area A.

Next, another example of the abnormality handling process in the present embodiment (hereinafter, the present example is referred to as a "second abnormality handling process example") will be described.

In the present second abnormality handling process example, if the recognition result, of the head position, based on the captured image of the driver camera 150 satisfies a predetermined abnormal condition, an abnormality handling process is performed in which at least part of the image parts 711, 712, 721, 722, and 723 displayed in the upper display area A is undisplayed. In the description below, processes similar to the above first abnormality handling process example are not described again if appropriate.

FIG. 18 is a flowchart illustrating a flow of a process in the present second abnormality handling process example.

Also in the present second abnormality handling process example, similarly to the above first abnormality handling process example, if the current recognition result of the head position satisfies any one of the abnormal conditions, the abnormality handling process is performed instead of the motion parallax control, in which abnormality handling process the image parts 711, 712, 721, 722, and 723 displayed in the upper display area A are kept at the immediately preceding display positions (steps S31 to S42). However, in the present second abnormality handling process example, if the recognition result of the head position satisfies the abnormal condition for a period longer than a specified time (step S51), an abnormality handling process immediately preceding display positions is performed in which at least part of the image parts 711, 712, 721, 722, and 723 is undisplayed (step S52).

At this time, an image part to be undisplayed cannot provide the for-driver information to the driver any longer by that image part; therefore, it is preferable to undisplay the image part that gives more trouble when the image part having no effect of motion parallax is kept displayed than when the image part is undisplayed and provides no for-driver information to the driver, for example. For example, in the present second abnormality handling process example, the following-distance presenting image 712 is undisplayed.

With the present second abnormality handling process example, in the case that the cause of the incorrect recognition of the head position or the unrecognizability is, for example, not a temporary one such as a change in the imaging environment but a continuous one such as a failure of the driver camera 150, it is possible to avoid a trouble caused by an image having no effect of motion parallax being displayed for long.

Note that, instead of the abnormality handling process in which the image parts 711, 712, 721, 722, and 723 are kept at the immediately preceding display positions, an abnormality handling process may be performed in which at least a part of the image parts 711, 712, 721, 722, and 723 is undisplayed. That is, if the current recognition result of the head position satisfies any of the abnormal conditions, the abnormality handling process may be performed in which at least part of the image parts 711, 712, 721, 722, and 723 without abnormality handling process to keep at the immediately preceding display positions.

Next, still another example of the abnormality handling process in the present embodiment (hereinafter, the present example is referred to as a "third abnormality handling process example") will be described.

In the present third abnormality handling process example, if the recognition result, of the head position, based on the captured image of the driver camera 150 satisfies a predetermined abnormal condition, an abnormality handling process is performed in which the display position of at least part of the image parts 711, 712, 721, 722, and 723 displayed in the upper display area A is changed to a predetermined reference position.

FIG. 19 is a flowchart illustrating a flow of a process in the present third abnormality handling process example.

In the present third abnormality handling process example, if the current recognition result of the head position satisfies any of the abnormal condition similarly to the above first abnormality handling process example, an abnormality handling process is performed in which the display positions of the image parts 711, 712, 721, 722, and 723 displayed in the upper display area A are changed to predetermined reference positions (step S71), instead of the abnormality handling process (process for keeping at the immediately preceding display positions) in the above first abnormality handling process example being performed.

Regarding the reference position, in a simple manner, for example, the position corresponding to the most normal position of the head of the driver sitting in the driver's seat may be previously stored in the ROM 253, and this position may be used as the reference position. However, even if the driver sits on the same driver's seat, the head position of the driver 300 depends on an anteroposterior position of the driver's seat, an angle of the seat back, a physical feature such as a height of the driver. Therefore, for example, it is possible to store in the RAM 252 the position corresponding to the first, normally recognized head position of the driver based on the captured image of the driver camera 150 after the on-vehicle HUD 200 is started, and such position may be used as the reference position.

Also in the present third abnormality handling process example, in a similar manner to the above first abnormality handling process example, even if the head position of the driver cannot be recognized or an abnormal recognition result of the head position of the driver occurs due to some causes, it is possible to avoid the visibility of the image parts from being lowered and unnecessary stress given to the driver during driving 300.

Note that, in the present embodiment, the HUD 230 serving as an image-light projection device is used as the image display, which image-light projection device projects the image light to the light transmission member so as to display the for-driver information image in the predetermined display area 700 that the driver 300 visually recognizes ahead in a mobile object traveling direction via the light transmission member such as the windshield 302; however, the image display may be a device that displays the for-driver information image on the display device such as a liquid crystal display and an organic EL display disposed on the dashboard or the like near the driver's seat.

As described above, the inventor found that, when information is provided to the driver, it is effective to change a perception distance depending on movement information and position information of a mobile object that the driver is driving even if the image having the same content of information is displayed. In detail, if display control is performed to change the perception distance of a for-driver information image depending on at least one of the movement information such as speed and acceleration of the mobile object that the driver is driving and the position information such as GPS (Global Positioning System) information of the mobile object, it is possible to provide at least one advantageous effect, for example, as described above.

In one embodiment, an information provision device such as an on-vehicle HUD 200 includes an image display such as an HUD 230 that displays a for-driver information image such as a following-distance presenting image 712 that displays for-driver information such as following-distance information that is provided to a driver 300 of a mobile object such as vehicle 301. The information provision device includes: an obtaining unit such as data I/F 255 that obtains at least one of (i) movement information such as vehicle-speed information and acceleration information of the mobile object and (ii) position information such as route navigation information of the mobile object; and a display controller such as the CPU (251) of the image controller 250 that performs a display control in which perception distances Lb and Lc, of the for-driver information image, for the driver due to motion parallax. More specifically, the display controller changes a display position of the for-driver information image, based on a detection result of the viewpoint detector (driver camera 150) indicating a viewpoint position of the driver. The display controller performs the display control such that the perception distance of the for-driver information image for the driver due to motion parallax, changes according to the at least one piece of information that the obtaining unit obtains.

Accordingly, the perception distance of the for-driver information image, for the driver due to motion parallax, can be changed based on at least one of the movement information and the position information of the mobile object.

In the above-described embodiment, in one example, the obtaining unit obtains moving-speed information such as vehicle-speed information of the mobile object as the movement information, and the display controller performs, depending on the moving-speed information obtained by the obtaining unit, the display control such that the perception distance is more distant as a moving speed of the mobile object is higher and such that the perception distance is shorter as the moving speed of the mobile object is lower.

In order to quickly and surely provide information to the driver driving the mobile object, it is effective, as described above, to display the for-driver information image indicating the information at a position close to an observation area that the driver is observing. However, the driver generally tends to observe a more distant point as the speed of the mobile object is higher. Therefore, the distance of the observation area of the driver can vary depending on the speed of the mobile object. In such a case, if the perception distance of the for-driver information image is constant, the for-driver information image may be away from the observation area, depending on the speed of the mobile object. Accordingly, the for-driver information cannot be quickly and surely provided to the driver. With the present aspect, the perception distance, of the for-driver information image, due to motion parallax is changed such that the perception distance is longer as the speed of the mobile object is higher and such that the perception distance is shorter as the speed of the mobile object is lower; thus, even if the speed of the mobile object changes, the for-driver information can be quickly and surely provided to the driver.

In the above-described embodiment, in one example, the obtaining unit obtains the moving-speed information of the mobile object as the movement information, and the display controller performs the display control such that the perception distance becomes shorter when the moving-speed information obtained by the obtaining unit satisfies a predetermined speed-increase warning condition.

When the perception distance of the for-driver information image is changed, the driver often changes the distance (focal length) of the observation point so as to follow the for-driver information image. Because the driver tends to observe a close point when the speed of the mobile object is low as described above, if the observation point of the driver is moved closer, the driver tends to try to reduce the speed of the mobile object. As a result, by shortening the perception distance of the for-driver information image, it is possible to prompt the driver to reduce the speed. With the present aspect, if the speed of the mobile object satisfies the predetermined speed-increase warning condition, the perception distance, of the for-driver information image, due to motion parallax becomes shorter. Thus, for example, if a condition is appropriately set as the predetermined speed-increase warning condition, with which condition it can be recognized that the speed of the mobile object increases before the driver notices it, it is possible to prompt the driver to reduce the speed of the mobile object, thereby contributing reduction of traffic accidents due to excessive speed.

In the above-described embodiment, in one example, the obtaining unit obtains position information such as the route navigation information of the mobile object, and the display controller performs the display control such that the perception distance becomes shorter when the position information obtained by the obtaining unit satisfies a predetermined speed-increase warning condition.

With the present aspect, for example, if a condition is appropriately set as the predetermined speed-increase warning condition, with which condition it can be recognized that the mobile object passes through such a position that the speed of the mobile object increases before the driver notices it, it is possible to prompt the driver, when in such a situation, to reduce the speed of the mobile object by shortening the perception distance, of the for-driver information image, due to motion parallax, thereby contributing reduction of traffic accidents due to excessive speed.

In the above-described embodiment, in one example, the obtaining unit obtains the speed information of the mobile object as the movement information, and the display controller performs the display control such that the perception distance becomes longer when the moving-speed information obtained by the obtaining unit satisfies a predetermined slowdown warning condition.

As described above, if the perception distance of the for-driver information image changes, the driver often changes the distance (focal length) of the observation point so as to follow the for-driver information image. Then, because the driver tends to observe a distant point when the speed of the mobile object is high, if the observation point of the driver is changed to a distant position, the driver tends to increase the speed of the mobile object. Therefore, by increasing the perception distance of the for-driver information image, it is possible to prompt the driver to increase the speed. With the present aspect, if the speed of the mobile object satisfies the predetermined slowdown warning condition, the perception distance, of the for-driver information image, due to motion parallax becomes longer. Thus, for example, if a condition is appropriately set as the predetermined slowdown warning condition, with which condition it can be recognized that there is a situation that the speed of the mobile object decreases before the driver notices it, it is possible to prompt, when in such a situation, the driver to increase the speed of the mobile object, thereby contributing to reducing generation of congestion or reducing delay in recovering from congestion due to speed reduction of mobile objects.

In the above-described embodiment, in one example, the obtaining unit obtains position information of the mobile object, and the display controller performs the display control such that the perception distance becomes longer if the position information obtained by the obtaining unit satisfies a predetermined slowdown warning condition.

With the present aspect, for example, if a condition is appropriately set as the predetermined slowdown warning condition, with which condition it can be recognized that the mobile object passes through such a position that the speed of the mobile object decreases before the driver notices it, it is possible to prompt the driver, when in such a situation, to increase the speed of the mobile object by increasing the perception distance, of the for-driver information image, due to motion parallax, thereby contributing to reducing generation of congestion or reducing delay in recovering from congestion due to reduction in the speed of mobile objects.

In the above-described embodiment, it takes one second or longer for the display control to change the perception distance.

With this arrangement, when the perception distance, of the for-driver information image, due to motion parallax is changed, it is possible to prevent the driver from recognizing that the for-driver information image instantaneously moves from the position before changing to the position after changing. As a result, it is possible to change the perception distance, of the for-driver information image, due to motion parallax without giving unnecessary visual stimulus to the driver during driving.

In the above-described embodiment, the display controller causes the image display to display plural kinds of the for-driver information images (for example, the image displayed in the upper display area A and the images displayed in the lower display area B) each of which has different perception distance from each other, and performs the display control such that the perception distance of at least one kind of image of the plural kinds of the for-driver information images is changed.

With this operation, it is possible to change the perception distance of only a part of multiple kinds of the for-driver information images displayed by the image display or to differentiate the perception distance of each of the plural kinds of the for-driver information images.

In the above-described embodiment, the image display is an image-light projection device that projects the image light to a light transmission member such as the windshield 302 so as to display the for-driver information image in the predetermined display area 700 that the driver 300 visually recognizes, ahead in a mobile object traveling direction, via the light transmission member.

This arrangement allows the driver driving the mobile object to visually recognize the for-driver information image without largely turning the driver's eyes from the mobile object traveling direction.

In the above-described embodiment, the image display includes a display area moving unit such as a projector mirror 211 that moves the predetermined display area as driven by a drive motor. In the display control, the perception distance is changed by changing the display position of the for-driver information image and the predetermined display area, based on the detection result of the viewpoint detector.

This arrangement makes it possible to change the position, at which the for-driver information image is visually recognized, without being limited by the size of the display area. This allows to change the perception distance in a wider range without making the for-driver information image smaller.

In the above-described embodiment, the image-light projection device displays the for-driver information image with the projected image light as a virtual image G in the predetermined display area, and the distance from the driver to the virtual image is equal to or greater than 5 m.

If the distance to the virtual image G is about 2 m, which is a common distance, the eyeballs usually need to perform a convergence movement to make the eyes focus on the virtual image G. As described above, the convergence movement is a cause that largely affects the sense of distance to the viewing object and the depth perception, and if the convergence movement is performed to focus on the virtual image G, the sense of distance (change in the perception distance) and the depth perception (difference in the perception distance) due to motion parallax cannot be effectively visually recognized.

With the present aspect, since the distance to the virtual image G is equal to or greater than 5 m, it is possible to focus on the virtual image G almost without letting the eyeballs perform a convergence movement. Accordingly, the sense of distance (change in perception distance) or the depth perception (difference in perception distance), which are expected to be brought by motion parallax, can be perceived as desired in absence of the convergence motion of the eyes.

In the above-described embodiment, the image-light projection device displays the for-driver information image in the predetermined display area by making a light scanner such as an optical scanner 208 two-dimensionally scan and project, onto the light transmission member, the image light emitted from a light emitter such as a light source unit 220 that emits image light depending on image information of the for-driver information image.

As described above, it is easy to display a larger virtual image G in a higher brightness than by using a liquid crystal display (LCD), a vacuum fluorescent display (VFD), or the like. With the present aspect, since image light is not emitted from light emitter to a non-image part in the virtual image G, it is possible to completely eliminate light on the non-image part. Thus, it is possible to avoid the visibility of the scenery, through the non-image part, ahead of the mobile object from being lowered by the light emitted from the light emitter, and the visibility of the scenery ahead is high.

In one embodiment, an information providing method is provided, which causes an image display to display a for-driver information image to the driver of a mobile object. The method includes: obtaining at least one piece of information of movement information of the mobile object and position information of the mobile object; detecting a viewpoint position of the driver; and performing a display control to change a perception distance, of the for-driver information image, for the driver due to motion parallax, by changing a display position of the for-driver information image, depending on a detection result in the step of detecting a viewpoint position. In the step of performing a display control, the display control is performed such that the perception distance, of the for-driver information image, for the driver due to motion parallax changes depending on the at least one piece of information obtained in the step of obtaining at least one piece of information.

With the present aspect, it is possible to change the perception distance, of the for-driver information image, for the driver due to motion parallax, depending on the movement information and the position information of the mobile object.

In another embodiment, a control program for causing an image display to display a for-driver information image to a driver of a mobile object is provided, which performs the above-described method.

In another embodiment, an information provision device such as an on-vehicle HUD 200 includes an image display such as an HUD 230 that displays for-driver information image such as the lane indicator image 711, the following-distance presenting image 712, the path indicator image 721, the remaining distance indicator image 722, and the intersection or the like name indicator image 723 that display various kinds of for-driver information to be provided to a driver 300 of a mobile object such as a vehicle 301. The information provision device includes: a viewpoint detector such as a driver camera 150 that detects a viewpoint position of the driver; and a display controller such as the processor of the image controller 250 that performs a display control in which a perception distance, of the for-driver information image, for the driver due to motion parallax is changed by changing a display position of the for-driver information image, depending on the detection result of the viewpoint detector. The display controller performs, instead of the display control, a predetermined abnormality handling process if the detection result of the viewpoint detector satisfies the predetermined abnormal condition.

Accordingly, if an abnormality satisfying a predetermined abnormal condition occurs in a detection result by the viewpoint detector, the display control is not performed based on the abnormal detection result. This prevents a situation from occurring in which the display position of the for-driver information image is abnormally changed. Instead, an abnormality handling process having an appropriate content is performed when an abnormality occurs in the detection result by the viewpoint detector. This results in securing the visibility, of the for-driver information image, for the driver while achieving reduction in unnecessary stress that can be given to the driver.

In the above-described embodiment, in one example, the predetermined abnormal condition includes a condition that the viewpoint detector cannot detect the viewpoint position of the driver.

With this arrangement, even if the viewpoint position of the driver cannot be detected, a situation does not occur in which the display position of the for-driver information image abnormally changes, and an abnormality handling process having an appropriate content is performed. This results in securing the visibility, of the for-driver information image, for the driver while achieving reduction in unnecessary stress that can be given to the driver.

In the above-described embodiment, the predetermined abnormal condition includes a condition that the viewpoint position of the driver detected by the viewpoint detector is a viewpoint position out of a predetermined viewpoint-moving range such as a specified range with respect to a viewpoint position having been detected in the past.

With this arrangement, even if the viewpoint detector detects, as a viewpoint position, a position that is out of a detection range of the viewpoint detector or at which the viewpoint of the driver during driving cannot normally be located, a situation does not occur in which the display position of the for-driver information image changes abnormally, and an abnormality handling process having an appropriate content is performed. This results in securing the visibility, of the for-driver information image, for the driver while achieving reduction in unnecessary stress that can be given to the driver.

In this embodiment, in one example, the predetermined abnormal condition includes a condition that multiple viewpoint positions detected by the viewpoint detector in a predetermined period satisfy a predetermined viewpoint-abnormally-moving condition.

With this arrangement, even if the viewpoint detector detects a viewpoint position that indicates that the motion of the head of the driver exhibits a motion that cannot normally be exhibited, a situation does not occur in which the display position of the for-driver information image changes abnormally, and an abnormality handling process having an appropriate content is performed. This results in securing the visibility, of the for-driver information image, for the driver while achieving reduction in unnecessary stress that can be given to the driver.

In this embodiment, in one example, the predetermined abnormality handling process includes a process in which the display position, of the for-driver information image, immediately before the detection result of the viewpoint detector satisfies the predetermined abnormal condition is kept.

With this arrangement, even if the viewpoint position of the driver cannot be detected or the viewpoint position of the driver is mistakenly detected due to some causes, it is possible to avoid the visibility of the for-driver information image from being lowered or unnecessary stress from being given to the driver during driving 300.

In this embodiment, in one example, the predetermined abnormality handling process includes a process in which the for-driver information image is not displayed, for example, through hiding or stopping display.

With this arrangement, even if the viewpoint position of the driver cannot be detected or the viewpoint position of the driver is mistakenly detected due to some causes, it is possible to avoid the visibility of the for-driver information image from being lowered or unnecessary stress from being given to the driver during driving 300.

In this embodiment, in one example, the predetermined abnormality handling process includes a process in which the display position of the for-driver information image is changed to a predetermined reference position.

With this arrangement, even if the viewpoint position of the driver cannot be detected or the viewpoint position of the driver is mistakenly detected due to some causes, it is possible to avoid the visibility of the for-driver information image from being lowered or unnecessary stress from being given to the driver during driving 300.

In this embodiment, in one example, the display controller performs the display control, based on the detection result when the detection result of the viewpoint detector does not satisfy the predetermined abnormal condition any longer after performing the predetermined abnormality handling process.

With this arrangement, even in the case that the viewpoint position of the driver cannot be detected or the viewpoint position of the driver is mistakenly detected due to a temporary cause, it is possible to resume after removal of the cause the display control in which the display position of the for-driver information image is changed so as to change the perception distance for the driver due to motion parallax.

In this embodiment, in one example, the viewpoint detector includes a detector that detects the viewpoint position of the driver, based on a captured image of a head of the driver captured by an imaging unit.

With this arrangement, the viewpoint position of the driver can be detected highly precisely.

In this embodiment, in one example, the information provision device includes an illuminator that illuminates an imaging area of the imaging unit.

With this arrangement, the captured image having a constant quality can be obtained without being largely affected by an imaging environment (for example, the difference in intensity of external light) of the imaging unit, such that a viewpoint position can be stably detected with the influence of the imaging environment being controlled.

In this embodiment, in one example, the imaging unit is a camera that takes an image of infrared light rays.

With this arrangement, the viewpoint position of the driver can be detected by using a captured image (thermography) that detects far infrared rays emitted from the head of the driver, and the viewpoint position of the driver can be detected by using an infrared image that is not affected by visible light.

In this embodiment, in one example, the viewpoint detector includes a detector that detects the viewpoint position of the driver in the driver's seat by using a detection result of a sensor provided on the driver's seat of the mobile object.

Also with this aspect, the viewpoint position of the driver can be detected.

In this embodiment, in one example, the image display is an image-light projection device that projects image light to a light transmission member so as to display the for-driver information image in the predetermined display area 700 that the driver 300 visually recognizes, ahead in a mobile object traveling direction, via the light transmission member such as the windshield 302.

This arrangement allows the driver driving the mobile object to visually recognize the for-driver information image without largely turning the driver's eyes from the mobile object traveling direction.

In another embodiment, an information providing method is provided, which causes an image display to display a for-driver information image to a driver of a mobile object. The method includes: detecting a viewpoint position of the driver; and performing a display control to change a perception distance, of the for-driver information image, for the driver due to motion parallax, by changing a display position of the for-driver information image, depending on a detection result in the step of detecting a viewpoint position. In the step of performing a display control, if a detection result in the step of detecting a viewpoint position satisfies a predetermined abnormal condition, a predetermined abnormality handling process is performed instead of the display control.

With the present aspect, if an abnormality satisfying a predetermined abnormal condition occurs in a detection result by the viewpoint detector, the display control is not performed in which the perception distance for the driver due to motion parallax is changed. This prevents a situation from occurring in which the display position of the for-driver information image is abnormally changed. An abnormality handling process having an appropriate content is performed when an abnormality occurs in the detection result by the viewpoint detector. This results in securing the visibility, of the for-driver information image, for the driver while achieving reduction in unnecessary stress that can be given to the driver.

In another embodiment, a control program for causing an image display to display a for-driver information image to a driver of a mobile object is provided, which performs the above-described method.

Note that the above program can be distributed or obtained, being stored in a recording medium such as a CD-ROM. Via a public telephone line or an exclusive line, the program can be distributed or obtained also by delivering or receiving a signal on which the above program is carried and which is transmitted by a predetermined transmission device. When the program is delivered, at least part of the computer program has only to be transmitted in the transmission medium. That is, the transmission medium does not have to include all the data constituting the computer program at the same time. The signal on which the above program is carried is a computer data signal embodied as a predetermined carrier wave including the computer program. A transmission method for transmitting the computer program from the predetermined transmission device includes a case of continuously transmitting or a case of intermittently transmitting the data constituting the program.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The invention claimed is:

1. An information provision device comprising:
an image display to display a for-driver information image to a driver of a mobile object;
an interface to obtain at least one of movement information of the mobile object and position information of the mobile object; and
circuitry to
detect at least one viewpoint position of the driver that indicates at least one position of a single eye of the driver;
control display of the for-driver information image based on the detected at least one viewpoint position of the driver;
calculate a distance of movement of the at least one viewpoint position of the driver based on the detected at least one viewpoint position of the driver; and
change a display position of the for-driver information image in a direction opposite to a moving direction of the at least one viewpoint position of the driver by a distance based on the calculated distance of the movement of the at least one viewpoint position of the driver.

2. The information provision device of claim 1, wherein the interface obtains moving-speed information of the mobile object as the movement information, and
the circuitry controls display of the for-driver information image based on the moving-speed information that is obtained, such that the perception distance is more distant as a moving speed of the mobile object is higher and the perception distance is shorter as the moving speed of the mobile object is lower.

3. The information provision device of claim 2, wherein the interface obtains moving-speed information of the mobile object as the movement information, and
the circuitry controls display of the for-driver information image such that the perception distance becomes shorter when the obtained moving-speed information satisfies a predetermined speed-increase warning condition.

4. The information provision device of claim 1, wherein the interface obtains the position information of the mobile object, and
the circuitry controls display of the for-driver information image such that the perception distance becomes shorter when the obtained position information satisfies a predetermined speed-increase warning condition.

5. The information provision device of claim 1, wherein the interface obtains moving-speed information of the mobile object as the movement information, and
the circuitry controls display of the for-driver information image such that the perception distance becomes longer when the obtained moving-speed information satisfies a predetermined slowdown warning condition.

6. The information provision device of claim 1, wherein the interface obtains the position information of the mobile object, and
the circuitry controls display of the for-driver information image such that the perception distance becomes longer when the obtained position information satisfies a predetermined slowdown warning condition.

7. The information provision device of claim 1, wherein the circuitry controls to change the perception distance in a time period equal to or longer than one second.

8. The information provision device of claim 1, wherein the circuitry causes the image display to display a plurality of types of the for-driver information images each having a perception distance different from each other, and controls display of the plurality of types of the for-driver information images such that the perception distance of at least one type of the plurality of types of the for-driver information images is changed.

9. The information provision device of claim 1, wherein the image display is an image-light projection device that projects an image light to a light transmission member of the mobile object so as to display the for-driver information image in a predetermined display area that the driver visually recognizes, ahead in a mobile object traveling direction, via the light transmission member.

10. The information provision device of claim 9, wherein the image display includes a projector mirror to move the predetermined display area, and
the circuitry changes a position of the predetermined display area in addition to the display position of the for-driver information image, based on the detected at least one viewpoint position, so as to change the perception distance.

11. The information provision device of claim 9, wherein the image-light projection device displays the for-driver information image with the projected image light as a virtual image in the predetermined display area, and the distance from the driver to the virtual image is equal to or greater than 5 m.

12. The information provision device of claim 9, wherein the image-light projection device displays the for-driver information image in the predetermined display area by causing a light scanner to scan and project, onto the light transmission member, the image light emitted from a light emitter that emits image light based on image information of the for-driver information image.

13. The information provision device of claim 1, wherein the circuitry performs abnormality handling operation in response to the result of the detection satisfying the predetermined abnormal condition.

14. The information provision device of claim 13, wherein the predetermined abnormal condition includes a condition that the detected at least one viewpoint position of the driver is a viewpoint position out of a predetermined viewpoint-moving range with respect to a viewpoint position having been detected in the past.

15. The information provision device of claim 13, wherein the predetermined abnormal condition includes a condition that the detected at least one viewpoint position in a predetermined period satisfies a predetermined viewpoint-abnormally-moving condition.

16. The information provision device of claim 13, wherein, while performing the abnormality handling operation, the circuitry keeps a display position of the for-driver information image unchanged from the display position of the for-driver information image that is obtained immediately before the determination indicating that the detected at least one viewpoint position satisfies the predetermined abnormal condition.

17. The information provision device of claim 13, wherein, while performing the abnormality handling operation, the circuitry changes the display position of the for-driver information image to a predetermined reference position.

18. The information provision device of claim 13, wherein
the circuitry controls display of the for-driver information image, based on the detected at least one viewpoint position when the detected at least one viewpoint position does not satisfy the predetermined abnormal condition after performing the abnormality handling operation.

19. The information provision device of claim 1, wherein the circuitry is configured to
change, in response to a result of the detection failing to satisfy a predetermined abnormal condition, the display position of the for-driver information image so as to change a perception distance of the for-driver information image for the driver due to motion parallax based on the at least one of movement information and position information of the mobile object that is obtained.

20. An information provision method, comprising:
displaying a for-driver information image to a driver of a mobile object;
obtaining at least one of movement information of the mobile object and position information of the mobile object;
detecting at least one viewpoint position of the driver that indicates at least one position of a single eye of the driver;
controlling display of the for-driver information image based on the detected at least one viewpoint position of the driver;
calculating a distance of movement of the at least one viewpoint position of the driver based on the detected at least one viewpoint position of the driver; and
changing a display position of the for-driver information image in a direction opposite to a moving direction of the at least one viewpoint position of the driver by a distance based on the calculated distance of the movement of the at least one viewpoint position of the driver.

21. The information provision method of claim 20, further comprising
changing, in response to a result of the detection failing to satisfy a predetermined abnormal condition, the display position of the for-driver information image so as to change a perception distance of the for-driver information image for the driver due to motion parallax based on the at least one of movement information and position information of the mobile object that is obtained.

* * * * *